United States Patent [19]

Okada et al.

[11] Patent Number: 4,752,964
[45] Date of Patent: Jun. 21, 1988

[54] METHOD AND APPARATUS FOR PRODUCING THREE-DIMENSIONAL SHAPE

[75] Inventors: Gensuke Okada, Kunitachi; Gouhei Iijima, Kakogawa, both of Japan

[73] Assignee: Kawasaki Jukogyo Kabushiki Kaisha, Kobe, Japan

[21] Appl. No.: 721,451

[22] Filed: Apr. 9, 1985

[30] Foreign Application Priority Data

| Apr. 17, 1984 [JP] | Japan | 59-77212 |
| Apr. 17, 1984 [JP] | Japan | 59-77213 |
| Oct. 8, 1984 [JP] | Japan | 59-210775 |
| Nov. 30, 1984 [JP] | Japan | 59-253486 |

[51] Int. Cl.⁴ .............................................. G06K 9/00
[52] U.S. Cl. .................................... 382/1; 356/376; 364/475; 382/25; 382/65
[58] Field of Search .................. 382/1, 25, 28, 65; 358/107; 364/468, 474, 475, 476, 414; 356/376, 379, 380, 383, 384, 387

[56] References Cited

U.S. PATENT DOCUMENTS

| 4,404,684 | 9/1983 | Takada | 382/25 |
| 4,473,750 | 9/1984 | Oshida et al. | 356/376 |
| 4,539,639 | 9/1985 | Le Coq et al. | 364/414 |
| 4,558,420 | 12/1985 | Gerber | 364/474 |
| 4,587,396 | 5/1986 | Rubin | 364/468 |
| 4,593,967 | 6/1986 | Haugen | 356/376 |
| 4,594,001 | 6/1986 | Di Matteo et al. | 356/376 |
| 4,596,919 | 6/1986 | Kremers et al. | 356/379 |

Primary Examiner—Leo H. Boudreau
Assistant Examiner—Joseph Mancuso
Attorney, Agent, or Firm—Leydig, Voit & Mayer

[57] ABSTRACT

In an apparatus and method for producing from an object having a three-dimensional shape a shape equivalent or analoguous to the three-dimensional shape, light is irradiated to the object in an optical cutting plane. The light is picked up by an image pick-up device, and two-dimensional positions of the light are obtained for each minute distance in a direction perpendicular to the optical cutting plane to determine its three dimensional shape.

17 Claims, 24 Drawing Sheets

FIG. 14

| MEMORY ADDRESS | DATA | | |
|---|---|---|---|
| | ANGLE OF ROTARY ENCODER | X CO-ORDINATE | Z CO-ORDINATE |
| 1×1 | 0° | $X\varphi_1$ | $Z\varphi_1$ |
| 1×2 | 0° | $X\varphi_2$ | $Z\varphi_2$ |
| 1×3 | 0° | $X\varphi_3$ | $Z\varphi_3$ |
| ⋮ | ⋮ | ⋮ | ⋮ |
| 1×n | 0° | $X\varphi_n$ | $Z\varphi_n$ |
| 2×1 | $1 \times \frac{360°}{m}$ | $X\varphi_1$ | $Z\varphi_1$ |
| ⋮ | ⋮ | ⋮ | ⋮ |
| 2×n | $1 \times \frac{360°}{m}$ | $X\varphi_n$ | $Z\varphi_n$ |
| m×1 | $(m-1) \times \frac{360°}{m}$ | $X\varphi_1$ | $Z\varphi_1$ |
| ⋮ | ⋮ | ⋮ | ⋮ |
| m×n | $(m-1) \times \frac{360°}{m}$ | $X\varphi_n$ | $Z\varphi_n$ |

FIG. 15

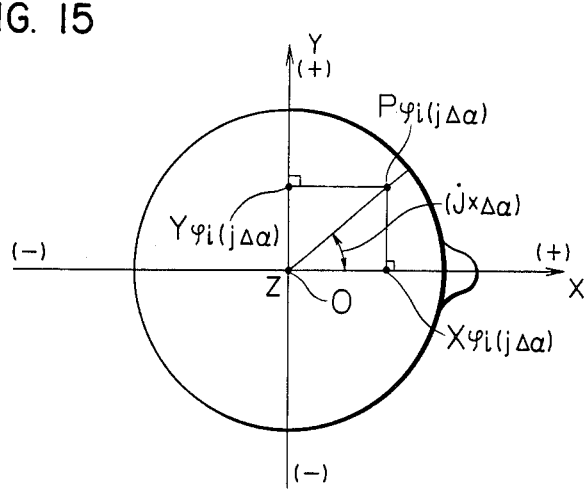

FIG. 16

| MEMORY ADDRESS | DATA | | |
|---|---|---|---|
| | X CO-ORDINATE | Y CO-ORDINATE | Z CO-ORDINATE |
| 1 | $X\varphi_1(0°)$ | $Y\varphi_1(0°)=0$ | $Z\varphi_1(0°)$ |
| 2 | $X\varphi_2(0°)$ | $Y\varphi_2(0°)=0$ | $Z\varphi_2(0°)$ |
| 3 | $X\varphi_3(0°)$ | $Y\varphi_3(0°)=0$ | $Z\varphi_3(0°)$ |
| ⋮ | ⋮ | ⋮ | ⋮ |
| n | $X\varphi_n(0°)$ | $Y\varphi_n(0°)=0$ | $Z\varphi_n(0°)$ |
| n+1 | $X\varphi_1(\Delta\alpha)$ | $Y\varphi_1(\Delta\alpha)$ | $Z\varphi_1(\Delta\alpha)$ |
| n+2 | $X\varphi_2(\Delta\alpha)$ | $Y\varphi_2(\Delta\alpha)$ | $Z\varphi_2(\Delta\alpha)$ |
| n+3 | $X\varphi_3(\Delta\alpha)$ | $Y\varphi_3(\Delta\alpha)$ | $Z\varphi_3(\Delta\alpha)$ |
| ⋮ | ⋮ | ⋮ | ⋮ |
| n×m | $X\varphi(m\Delta\alpha)$ | $Y\varphi(m\Delta\alpha)$ | $Z\varphi(m\Delta\alpha)$ |

| RANGE OF CO-ORDINATE | CORRESPONDING Y CO-ORDINATE | X CO-ORDINATE | Z CO-ORDINATE |
|---|---|---|---|
| | | | |
| $K \times \Delta y \leq Y < (K+1) \times \Delta y$ | $Y\varphi_i(j\Delta\alpha)$ | $X\varphi_i(j\Delta\alpha)$ | $Z\varphi_i(j\Delta\alpha)$ |
| | | | |
| $(K+1) \times \Delta y \leq Y < (K+2)$ | | | |

METHOD AND APPARATUS FOR PRODUCING THREE-DIMENSIONAL SHAPE

This invention relates to a method and apparatus for producing a three-dimensional shape or solid such as a three-dimensional image from an object having a three-dimensional shape such as a human body.

It has been proposed to employ a profile machine tool, cast, invertion mold, etc. in order to produce, from the object having a three-dimensional shape, its equivalent three-dimensional shape.

The above proposals have such a disadvantage that the dimensional limitations to the machine tool, cast, etc. restrict an object to such as capable of being molded in a three-dimensional shape, which makes it impossible to copy from an object having a complicated shape and significant unevenness a three-dimensional shape. They also have a disadvantage that if the object is a soft material, the copying thereof requires artistic sense as well as higher skill.

There is disclosed in an article entitled "Copying of Object Using Pattern Technique" in AUTOMATION TECHNIQUE, February 1981, Vol. 13, No. 2, pages 45–49, one application in which a slit optical image projected to an object is picked up by an ITV camera to provide spatial coordinates of the bright lines generated over the object surface, and the possibility of capable of copying the object. This article, however, does not disclose any concrete means for copying the object.

A principal object of this invention is to provide a method and apparatus which can provide an easy measurement method for producing a three-dimensional shape and makes it possible to produce, with high accuracy, a three-dimensional shape equivalent to or with a certain magnification for an object three-dimensional shape, regardless of the complexity of the object shape and the hardness thereof.

In order to attain the above object of this invention, a laser light is irradiated onto an object having a three-dimensional shape, the thus obtained optical image of the object is picked up to provide a two-dimensional position of the optical image, the optical cutting plane by the laser light is taken to be measured over the entire object, and a three-dimensional shape is produced on the basis of the optical cutting plane.

Other objects and features will become apparent from the following description taken in conjunction with the accompanying drawings in which FIGS. 1A and 1B are a front view and side view of a first embodiment according to this invention, respectively.

FIG. 14 shows a memory-map of a two-dimensional shape in the third embodiment of this invention;

FIG. 15 shows a principle of converting the two-dimensional shape to a three-dimensional structure in the third embodiment;

FIG. 16 shows a memory-map for conversion from the two-dimensional shape to the three-dimensional shape as shown in FIG. 14;

Figure 1A:
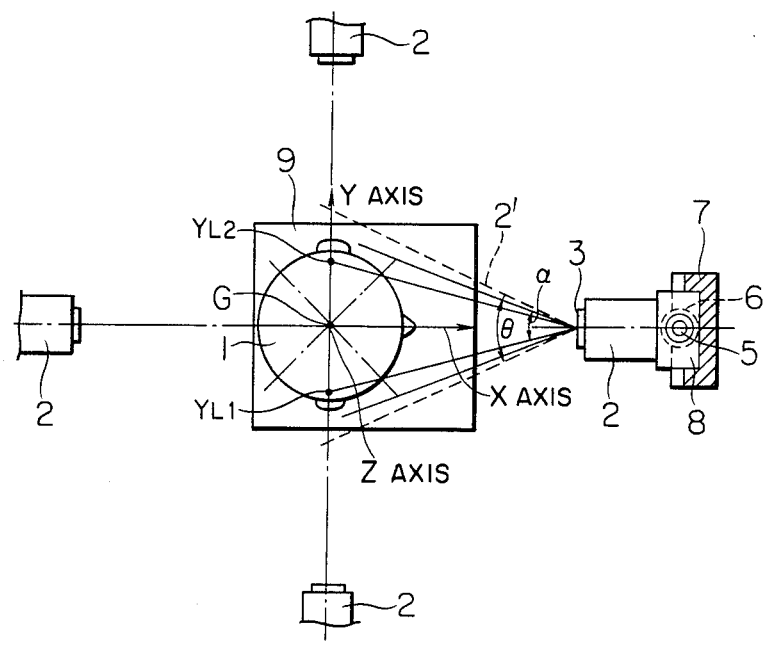
Figure 1B:
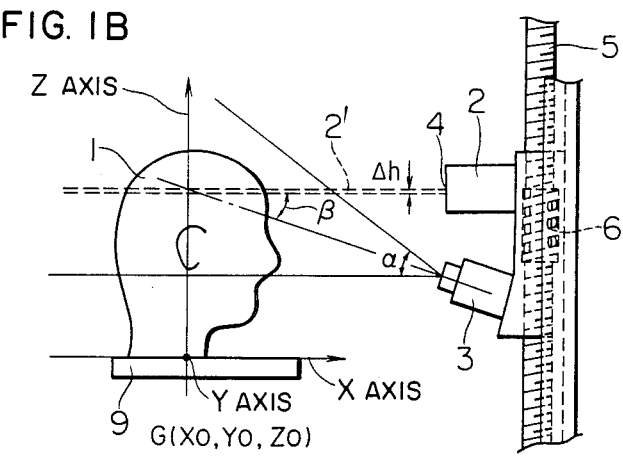

Hereafter, explanation will be made on the first embodiment of this invention with reference to the attached drawings. FIGS. 1A and 1B show a part of the arrangement of the first embodiment, in which, for simplicity of explanation, a model 1 of a simplified human face is employed as an object. Coordinates are set for the model; the coordinate axes are used as references for the irradiation positions of light beams and the positions of the image pick-up device of an optical image. In FIGS. 1A and 1B, the coordinates are set with an origin G of a bottom center of the model 1, an X-axis extending in the horizontal direction from the origin G in the front view of FIG. 1A, a Y-axis extending in the vertical direction from the origin G in the front view of FIG. 1A and a Z-axis of a vertical center line of the model 1 in the side view of FIG. 1B. A beam light irradiating device 2 irradiates light beams 2′ with a thickness $\Delta h$, e.g. 0.55 mm onto the model 1 as an object from a light source such as a laser beam generator. The light beam 2′ with a thickness $\Delta h$ is irradiated onto the model while being scanned through a revolving angle $\theta$ by means of a revolving mirror or the like and an optical lens system, using a perpendicular line drawn towards the Z-axis as a center line. Taking the light beam plane formed by the scanning of the light beam as an X–Y axis plane, and placing the origin G ($Z_0$) of the Z-axis on the bottom of the model, preparation for the measurement of the object is made.

An ITV camera 3, which is a two-dimensional image pick-up device, is arranged below the light beam irradiation device 2 with a fixed distance therefrom. The light beam 2′ of the light beam irradiation device 2 and the optical axis of the ITV camera 3 provide a fixed angle $\beta$ therebetween for the X–Y plane passing the Z-axis and the ITV camera 3 takes a view angle of $\alpha$. The light beam irradiation device 2 and the ITV camera 3 are fixedly mounted on a rack 8 slidably guided in a guide post 7; the rack 8 is fixed to a ball nut 6 screwed with a ball screw shaft 5. The ball screw shaft 5 is connected with a step motor (not shown) which stepwise drives the ball nut 6, hence the rack 8 up and down by the height corresponding to the diameter $\Delta h$ of the light beam.

In order to irradiate the entire outer periphery of the object model 1 with the light beam 2′ (entire periphery irradiation means), and correspondingly pick up the entire outer periphery by the ITV camera 3 serving as a two-dimensional image pick-up device, in this embodiment, four light beam irradiation devices 2 and four ITV cameras 3 are arranged to surround the object model 1. In this case, these ITV cameras 3 are arranged at an even distance from the Z-axis of the model 1 and with the same optical magnification to directly compare the optical images of the object model 1 formed by the respective light beams from the light beam irradiation devices 2, and to make the processing of the measured data relative to the optical images.

The geometical location of each of the light beam irradiation devices 2 and each of ITV cameras 3 for the object model 1 will be explained referring to FIGS. 2A and 2B.

Figure 2A:
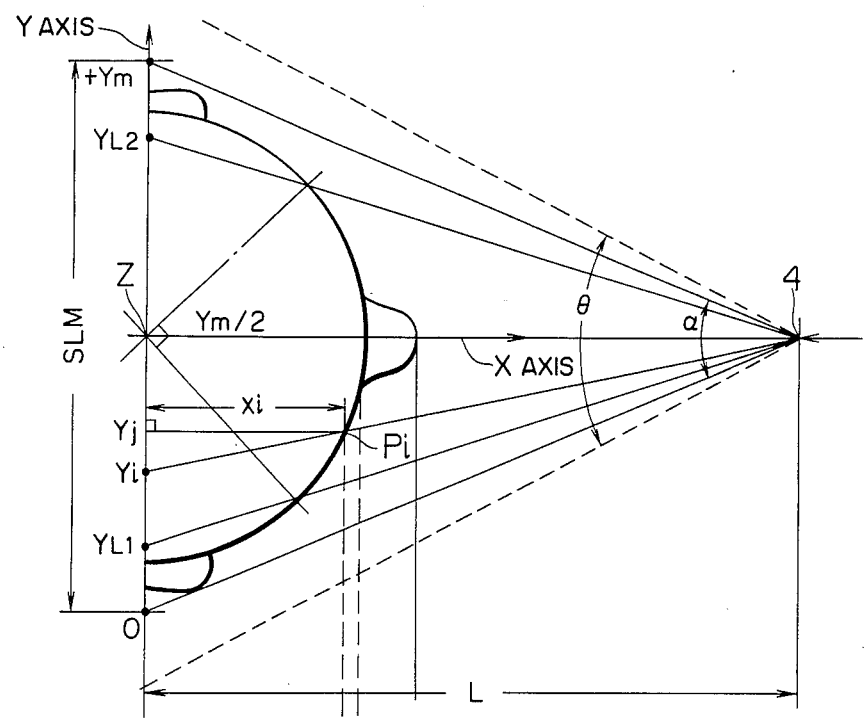
FIGS. 2A and 2B are views for explaining the measurement of the optical image of an object in the first embodiment of this invention.
Figure 2B:
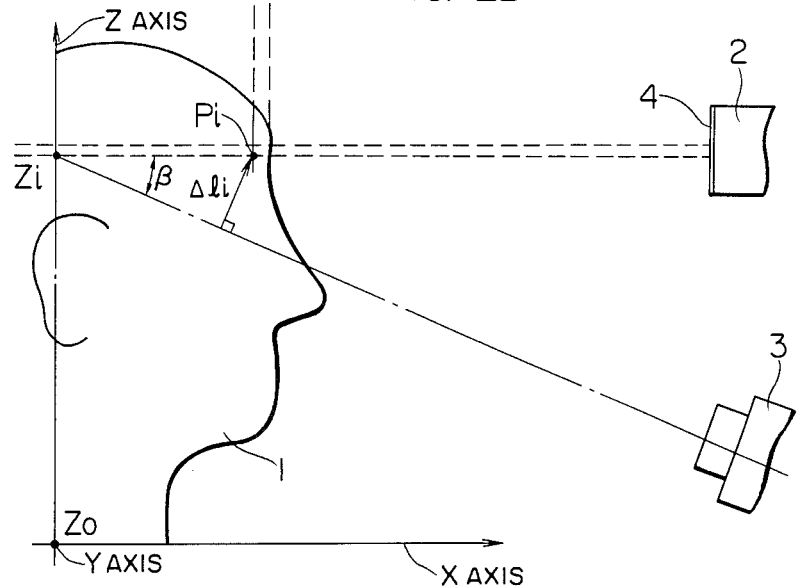
Figure 3:
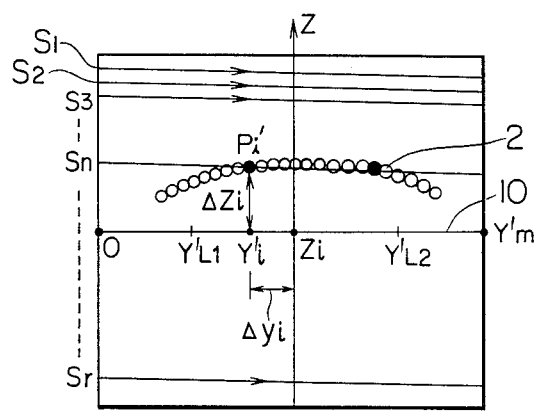
FIG. 3 is a view showing the image of an ITV camera (two-dimensional image pick-up device)

In FIG. 2A, the light beam 2′ from the light beam irradiation device 2 takes a revolving angle of $\theta$, the view limitation SLM for the Y-axis ranges from 0 to +Ym and the Y-axis position at the origin of the object model 1 is Ym/2. The irradiation range necessary to irradiate the entire periphery of the model 1 by means of one light beam irradiation device 2 is within 90° centering the origin G, i.e. within the range from $YL_1$ to $YL_2$ in the Y-axis. The light beam 2′ irradiated to the model 1 from the light beam irradiation device 2 intersects the optical axis 3′ of the ITV camera 3 as a two-dimensional image pick-up device on the Z-axis at a fixed angle of $\beta$; the projection position thereof to the Z-axis is assumed to be Zi. When the light beam 2′ irradiated to the object model 1 from the light beam irradiation device 2 is picked up by the ITV camera 3, the optical image on the associated section of the model 1 results in an optical image plane including a sickle image consisting of a succession of light beams, as shown in FIG. 3. In the optical image plane, a segment 10 indicates an image of the line passing the above Zi and parallel to the Y-axis. A point Pi′ shown in FIG. 3 represents the image of a point Pi of the light beam which may be any point of the light beam irradiated to the surface of the model 1.

Assuming that in FIG. 2 the length of a perpendicular line drawn from the point Pi toward the plane including the optical axis of the ITV camera 3 and parallel to the Y-axis is $\Delta li$, and in FIG. 3 the position of a perpendicular line drawn from the point Pi′ toward the segment 10 is Yi′ and the length of the segment Pi′Yi′ is $\Delta zi$, $$\Delta li = 1/n \times \Delta zi$$

where n is an optical magnification of the ITV camera.

In this case, $\Delta zi$ will be obtained in the following manner.

Figure 4:
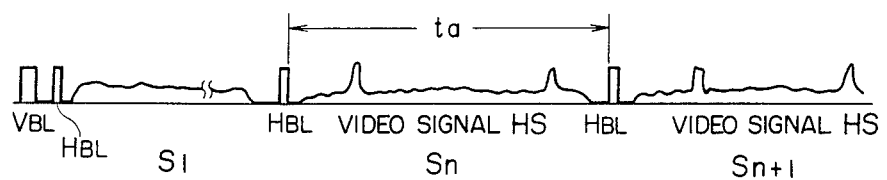
FIG. 4 shows the status of an image signal for the image as shown in FIG. 3.

One image plane of the ITV camera, as shown in FIG. 3, is constituted by r (generally about 240–500) scanning lines which are $S_1, S_2, \ldots S_n \ldots S_r$ in the order from the top. The ITV camera, as shown in FIG. 4 produces a starting signal $V_{BL}$ for the image plane, and then a first horizontal scanning signal $H_{BL}$. Thereafter, the video signal HS corresponding to the shading, brightness-and-darkenss signal of the image scan on the scanning line $S_1$ with a fixed time ta. After the scanning on $S_1$, the $H_{BL}$ signal is produced again and the video signal sequentially scans from $S_2$. When the scanning on $S_n$ finds the optical image of the light beam 2′, it significantly appears as a light beam video signal BHS in the image signal HS. The sequential repetition of scanning, reaching Sr terminates the scanning of one image plane. After the completion of the scanning of Sr, the light beam is shifted by $\Delta h$ to an adjacent position in the Z-direction by means of a motor. Then a starting signal $V_{BL}$ for a next one image plane is produced and the horizontal scanning starting signal is sequentially produced to start the scanning of a new image plane.

Figure 5:
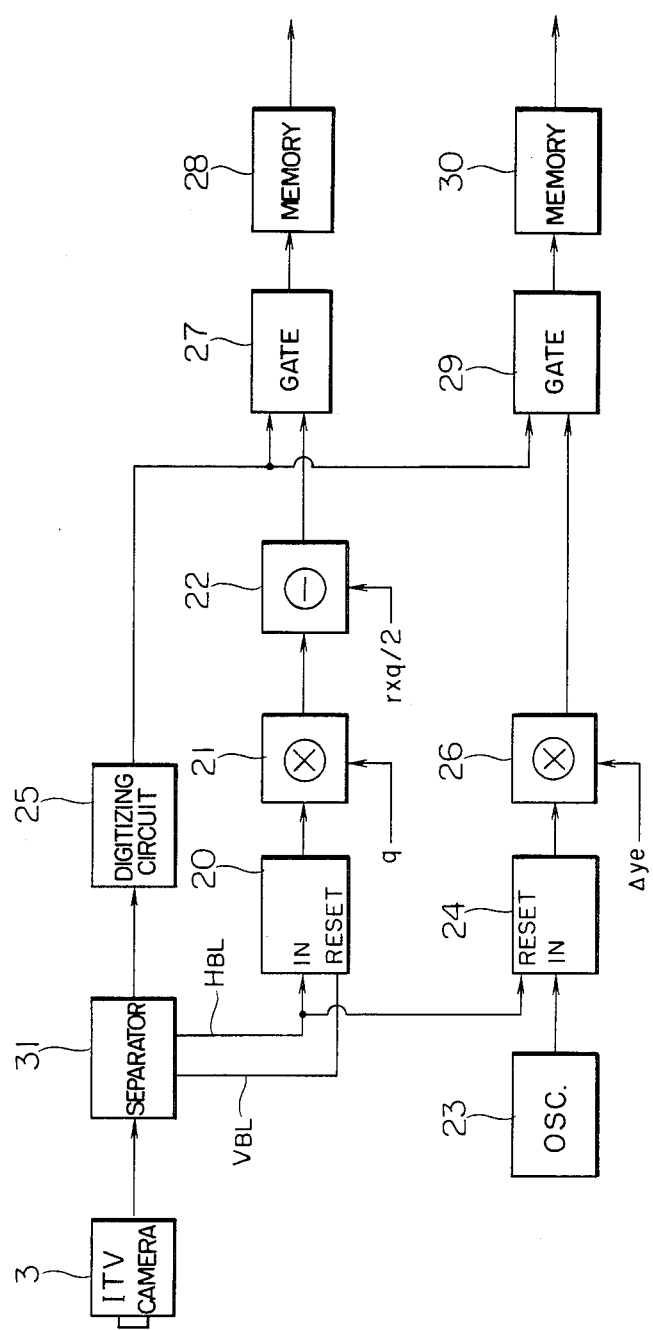
FIG. 5 is a block diagram which shows a data processing for the sectional shape operation in the first embodiment of this invention.

FIG. 5 is a block diagram showing a control circuit for obtaining $\Delta Zi$ using an ITV camera. In the figure, numeral 3 designates the ITV camera, and 31 designates a separation circuit in which there are inputted the video signal HS, horizontal scanning starting signal $H_{BL}$, and image plane starting signal $V_{BL}$ in the optical image of the light beam 2′ picked up by the ITV camera 3, and the video signal is separated from $H_{BL}$ and $V_{BL}$. 20 designates a counter for counting the number of the horizontal scanning starting signals $H_{BL}$, which is reset to 0 at a time when producing the image plane starting signal $V_{BL}$. Thus, the counter 20 counts the number of the horizontal scanning starting signals $H_{BL}$ during the time from the transmission of one image plane starting signal $V_{BL}$ to that of a subsequent $V_{BL}$. In this way, the scanning line number Si is detected from the value counted by the counter 20. The detected scanning line number Si is multiplied by a scanning line interval $\Delta q$ in a multiplier 21 to provide the length from $S_1$ to Si. This length is subtracted from a value of $r \times \Delta q/2$ (center line of the image plane, corresponding the position of the segment 10 of FIG. 3) in order to calculate the distance of the scanning point from the segment 10 in the vertical direction.

There is provided an oscillator 23 for producing interval pulses having a duration resulting from the division of the scanning time ta of one scanning line into m equal parts. The number of the interval pulses is counted by a counter 24 which is reset to 0 by the horizontal scanning starting signal. Namely, the counter 24 counts the number of interval pulses on a certain scanning line until the horizontal scanning starting signal $H_{BL}$ on the subsequent scanning line, and the counted value is multiplied by the length Δye resulting from the division of the length of the scanning line into m equal parts. In this way, the horizontal position of any scanning point on the image plane of the ITV camera is calculated from the output signal of the multiplier 26.

In order to convert the video signal into logical binary number with the brightness "1" and the darkness "0", a digitizing circuit 25 is connected with the rear of the separation 31, and only the video signal HS is output from the digitizing circuit in such a manner that the light beam image parts irradiated to the outer periphery of the object model 1 represent "1" while the other parts represent "0".

With respect to the vertical position of the optical image, the output of the subtractor 22 is stored in a memory circuit 28 through a gate circuit 27 when the output of the digitizing circuit 25 is "1". With respect to the horizontal position of the optical image, the output of the multiplier 26 is stored in a memory circuit 30 when the output of the digitizing circuit 25 is "1".

Thus, in accordance with the block diagram of FIG. 5, the vertical position Δzi and the horizontal position Δyi on one scanning line Si in FIG. 3 showing the optical image on one image plane are determined. Where plural Δzi's and Δyi's may be detected on one scanning line, all of them will be determined as $\Delta z i_1 - \Delta z i_p$ and $\Delta y i_1 - \Delta y i_p$.

The conversion of one image plane of the ITV camera into a two-dimensional plane including the light beam, i.e., X-Y axis system plane can be made from the following operation formula:

$$Xi = \frac{1}{n} \times \Delta zi \times \frac{1}{\sin\beta} \quad (1)$$

$$Yj = \left(\frac{Ym}{2} - \frac{1}{n} \times \Delta yi\right) + \left(\frac{Xi}{L} \times \frac{1}{n} \times \Delta yi\right) \quad (2)$$

where n is an optical magnification of the ITV camera.

The above operation is carried out by a general purpose microcomputer, etc. More specifically, an optical image locus in a certain section of the object is provided from the relation between the optical image of the light beam taken by the ITV camera, and the number of the scanned lines and the instant in a certain scannig line, thereby operating an optical section corresponding to the certain section.

The light beam 2' is stepwise driven up and down to be irradiated to the entire model 1. More specifically, the light beam irradiation device 2 is fixedly mounted on the rack 8 which is also fixed to the ball nut screwed with the ball screw shaft 5 so that by rotating the ball screw shaft 5 by means of the motor (not shown), the rack 8 can be stepwise driven up and down in the direction of the Z-axis by the light beam diameter (thickness) of Δh.

The optical image locus is provided through the light beam 2' for each diameter of Δh between the bottom end and top end of the model 1 which is an object in the plane formed by the light beam, i.e. X-Y axis system plane, and the shape data (Xi, Yi) on the X-Y axis system plane is provided for each light beam diameter of Δh.

The shape data (Xi, Yi) thus obtained for each diameter Δh of the beam light 2' are input into an NC laser cutting machine to make out the templates having the same shape as the shape data from a sheet of a thickness of Δh. By sequentially stacking up the thus made templates, the three-dimensional shape having the same shape as the object is constituted.

According to this embodiment, even where the object is complicate in its shape and is soft in its surface, like the face or figure of a person, the three-dimensional shape thereof can be easily produced.

Although in this embodiment, the sheet with the same thickness as the light beam diameter has been employed to make the template having the same shape as the object, the resultant three-dimensional shape can be easily enlarged or reduced by using the sheet having a thickness with a certain ratio to the beam diameter, and also the shape data with a certain ratio to the master shape data. Although in this embodiment, four light beam irradiation devices and four ITV cameras have been employed, a platform 9 is provided as shown in FIG. 1B and may be rotated by 90° to enable the irradiation of the object by means of one light beam irradiation device for the image pick-up by the associated ITV camera.

A second embodiment of this invention will be explained with reference to FIGS. 6-9.

In the first embodiment, the light beam irradiation device has been used as means for performing the scanning within a fixed angle, and the ITV camera serving as a two-dimensional image pick-up device has been used as image pick-up means. On the other hand, in the second embodiment, a light beam 12a' is moved in parallel to the Y-axis and as image pick-up means a one-dimensional line sensor camera serving as a one-dimensional image pick-up device is employed.

Figure 6A:
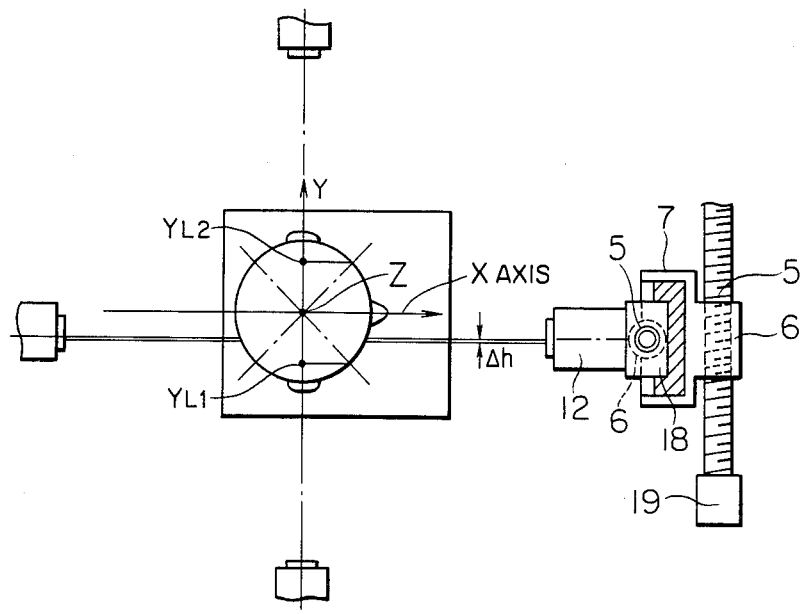
FIGS. 6A and 6B are a front view and side view of a second embodiment of this invention.
Figure 6B:
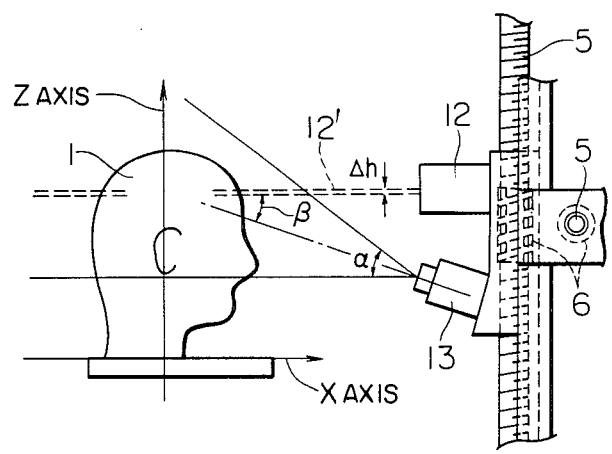

As shown in FIGS. 6A and 6B, numeral 12 designates a light beam irradiation device for irradiating the light beam 12' which performs only parallel scanning but not the scanning within a fixed angle unlike the first embodiment. The light beam irradiation device 12 is fixedly mounted on a rack 18 which is movable in a Y-axis and Z-axis directions. The light beam 12' having a diameter of Δh is projected towards a Y-Z axis system plane from the light beam irradiation device 12 and the object model 1 is irradiated with the light beam through the parallel scanning thereof while shifting the rack 18 in the Y-direction. The shift of the rack 18 in the Y-direction can be made by moving the ball nut 6 and ball screw shaft 5 by the step motor (not shown), like the driving in the Z-axis in the first embodiment. Incidentally, numeral 19 designates a position detector in the Y-axis.

A one-dimensional line sensor camera 13 is mounted on the rack 18 at its portion below the light beam irradiation device 12, parallel to the Z-axis so that the optical axis thereof takes an angle of β for an X-Y axis plane and the direction of detection is parallel to an X-Z axis plane.

In this embodiment also, four sets of the rack 18 are arranged to continuously detect the shape of the entire periphery of the object 1 around the Z-axis, but only one of them will be explained.

Figure 7A:
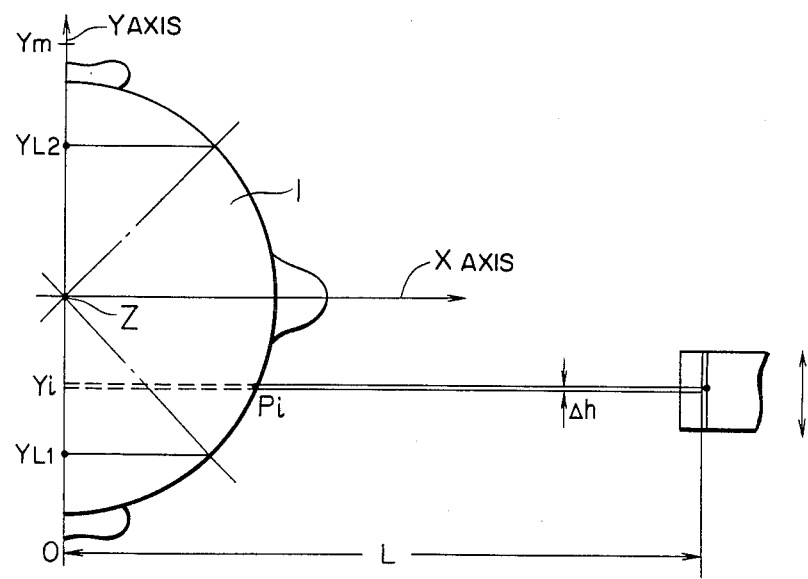
FIGS. 7A and 7B are views for explaining the measurement of the optical image of an object in the second embodiment of this invention.
Figure 7B:
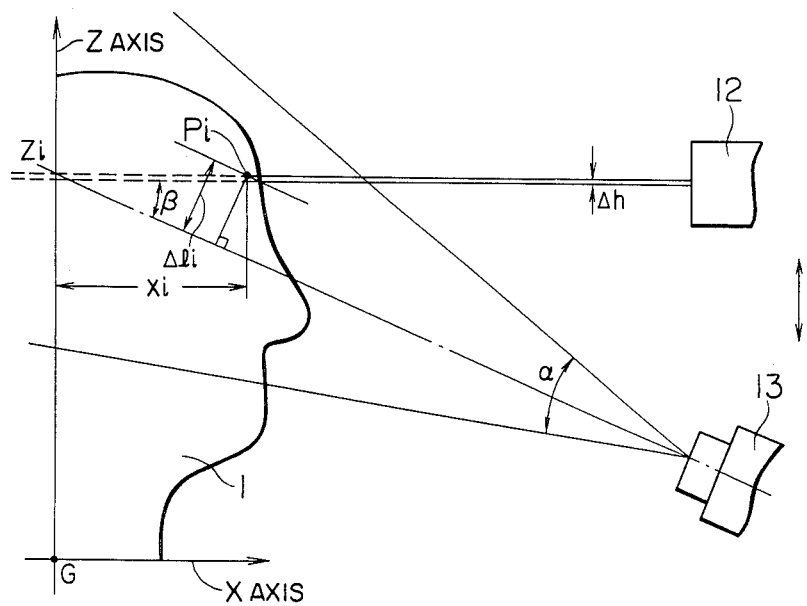

FIGS. 7A and 7B are a front view and side view for showing the geometrical locations of the light beam irradiation device 12 and the one-dimensional line sensor camera 13, respectively. In FIG. 7B, Zi is an intersecting point between the optical axis of the line sensor camera 13 and the Z-axis.

Figure 8A:
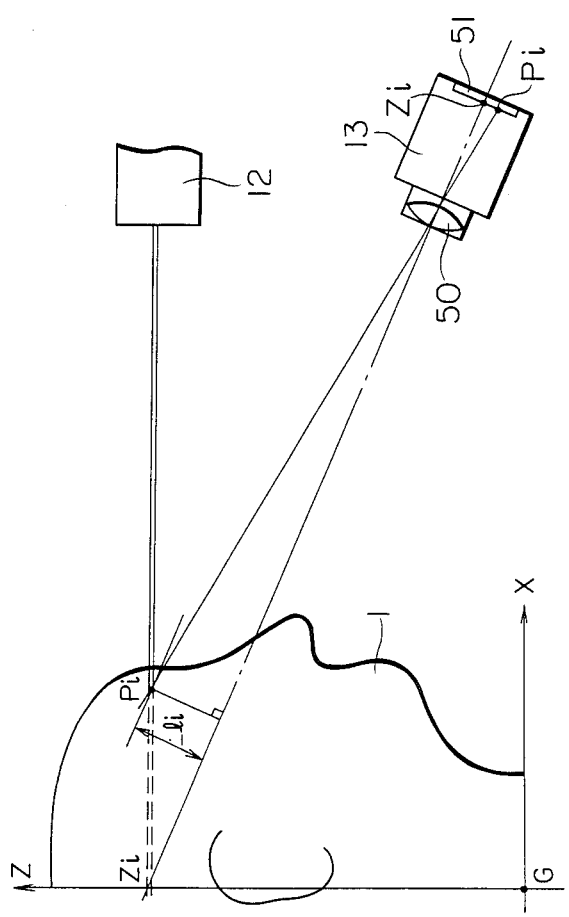
FIGS. 8A, 8B and 8C are views showing the pick-up state of a one-dimensional line sensor camera (image pick-up device) in the second embodiment of this invention.
Figure 8B:
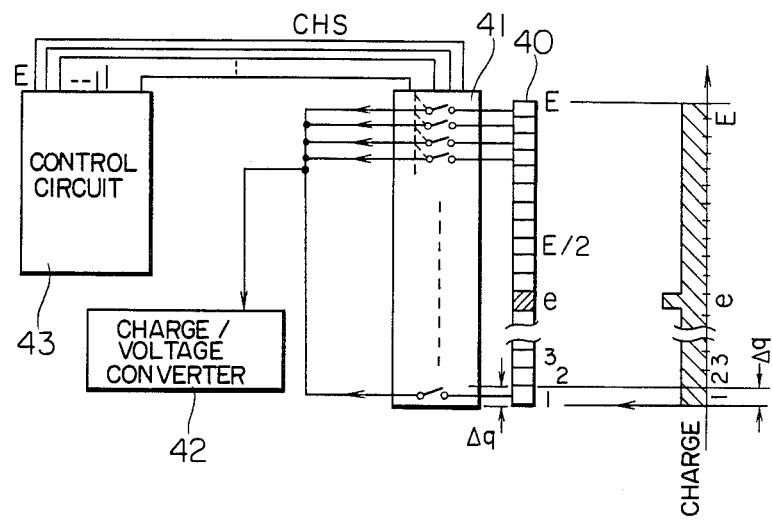

The one-dimensional line sensor camera 13, as shown in FIG. 8A, consists of an optical lens 50 and a one-dimensional line sensor 51 which has E number of minute optical sensors 40 (generally E is 128, 256, 512, 1024, ... 4096) arranged in a line, as shown in FIG. 8B.

It is now assumed that the intersecting point between the light beam 12' irradiated from the light beam irradiation device 12 and the surface of the model 1 is Pi, and when picking up the point Pi by the one-dimensional line sensor camera 12 the image Pi' appeared on the one-dimensional line sensor 51 is focused on the e-th element thereof and the image Z'i corresponding to a point Zi is focused on the E/2-th element thereof. Assuming that, in FIG. 8A, the length of a perpendicular line drawn from the point Pi to the plane including the optical axis 13 of the line sensor camera and parallel to the Y-axis is $\Delta li$, and the length of each of the elements in the one-dimensional sensor 51 in the direction of the line is $\Delta q$, the following relation is satisfied:

$$\Delta li = \frac{1}{n} \times \left[ \left( \frac{E}{2} - e \right) \times \Delta q \right] \quad (3)$$

where n is an optical magnification of the line sensor camera.

Moreover, the element number e of each element of the one-dimensional line sensor 51 on which the Pi' is focused is obtained in the following manner.

As shown in FIG. 8B, each element of the one-dimensional line sensor 51 provides the charge $\Delta q$ corresponding to the amount of received light (intensity of light x receiving time).

In the figure, numeral 41 designates switches for coupling the charge stored in each element with a charge-voltage converter 42. These switches is switched one by one for each $\Delta T$ time in order from the first switch in response to a switching signal CHS from a control circuit 43; at a certain instant of time, only one switch is opened.

Figure 8C:
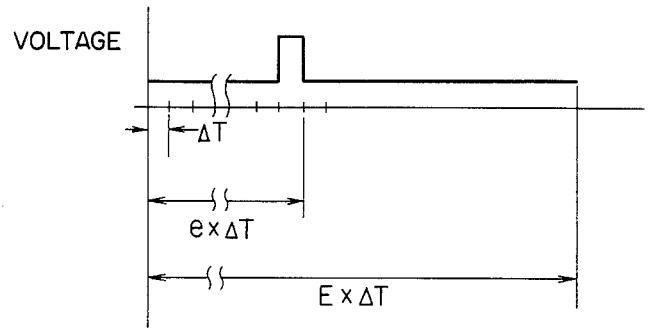

FIG. 8C shows an output voltage waveform resulting from the conversion the charge of each sensor element into voltage by means of the charge-voltage converter 42.

The e-th sensor element among the first to E-th elements provides a higher level of output than the other elements since the light beam image is focused thereon.

Figure 9:
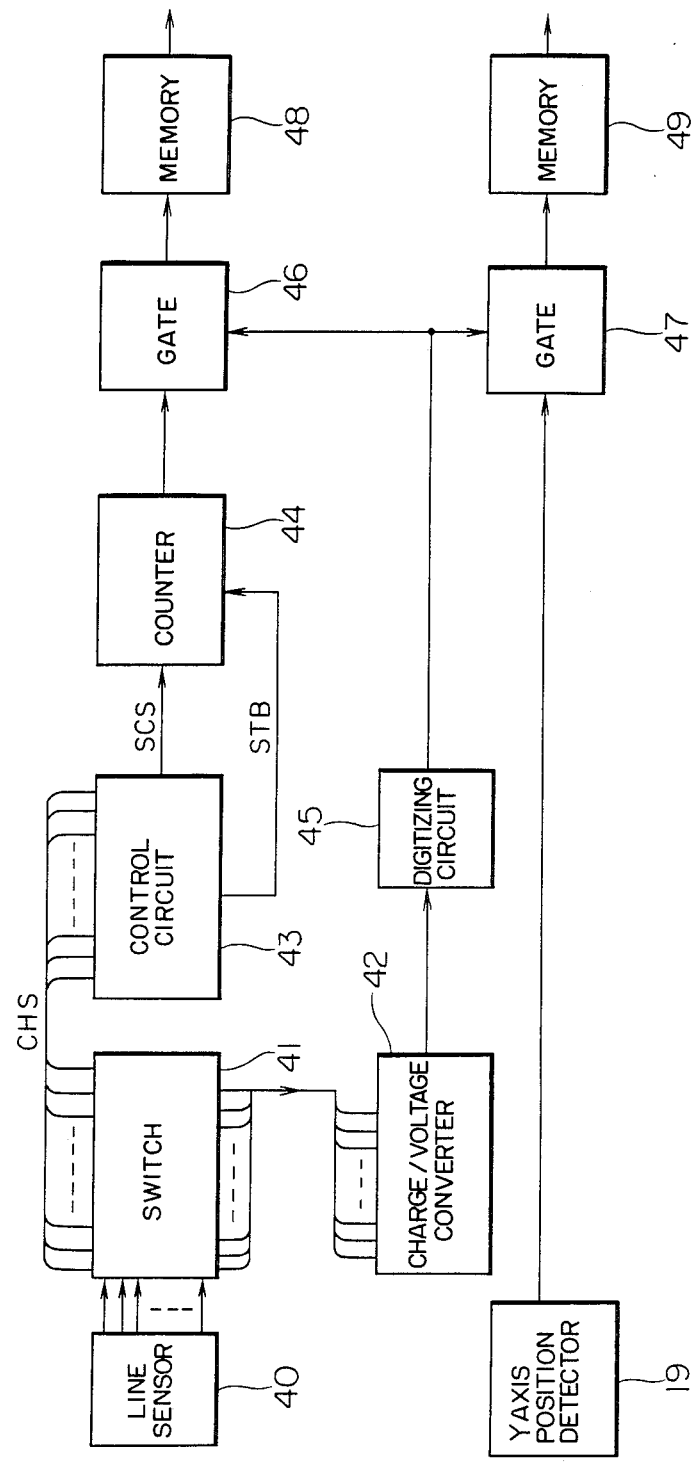
FIG. 9 is a block diagram which shows a data processing for the sectional shape operation in the second embodiment of this invention.

FIG. 9 shows a circuit for detecting the element number from the one-dimensional line output. In the figure, numeral 44 designates a counter for counting the number of switching signals, which is reset to 0 by a switching starting signal STB produced from the control circuit 43 immediately before a first switching signal is output from the control circuit 43, and counts the number of the switching signals output from the control circuit 43 till the subsequent STB signal is supplied. Therefore, the output of the counter 44 identifies the number of the switch which is now being switched.

A digitizing circuit 45 provides for converting the output voltage of the charge-voltage converter 42 into logical two values of the brightness "1" and the darkness "0", and outputs as "1" the portion (point Pi) of the surface of the model 1 to which the light beam is irradiated, and as "0" the other portion.

A gate circuit 46 provides for outputting and stores the output of the counter 44 into a memory circuit 48 when the output of the digitizing circuit 45 is "1" (brightness).

The rack 18, as mentioned above, is movable in both Y and Z axis directions, and its present position for each axis is detected using two position detectors. Another gate circuit 47 provides for outputting the output of the Y-axis position detector when the output of the digitizing circuit 45 is "1" (brightness) into a memory circuit 49 and stores it there in synchronism with the storing of the output of the counter 44 into the memory circuit 48. Such an operation is repeated at a pitch of the beam diameter of $\Delta h$ from the points 0 to Ym of FIG. 7A while moving the rack 18.

Meanwhile, the perpendicular line drawn from the point Pi to the Z-axis in the direction of X-axis is obtained from $$xi = \Delta li \times \frac{1}{\sin\beta} \quad (4)$$

and using equation (3)

$$xi = \frac{1}{n} \times \left[ \left( \frac{E}{2} - e \right) \times \Delta q \right] \times \frac{1}{\sin\beta} \quad (5)$$

The Y-ordinate of the point Pi in this time corresponds to the value of the Y-axis position detector. The operation of equation (5) is carried out by means of an electronic circuit, microcomputer, etc. to provide a sectional shape parallel to the X-Y plane of the object 1.

As in the first embodiment, templates are made on the basis of the thus obtained shapes, and a three-dimensional shape is produced by stacking the templates.

This second embodiment, in addition to the advantage of the first embodiment, can provide such a meritorious effect that the cost of the entire system is reduced because of the use of the one-dimensional line sensor camera(s).

Figure 10A:
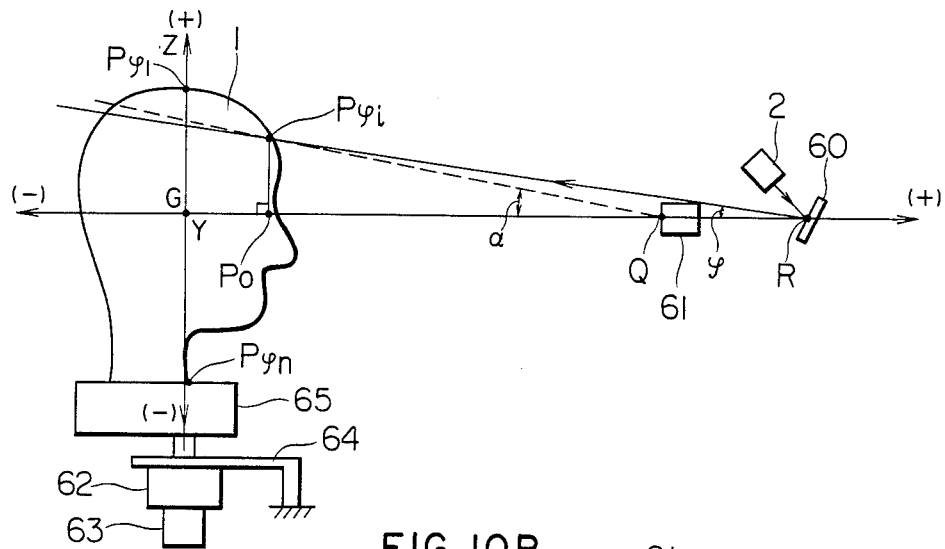
FIGS. 10A and 10B are a front view and side view of a third embodiment of this invention, respectively.
Figure 10B:
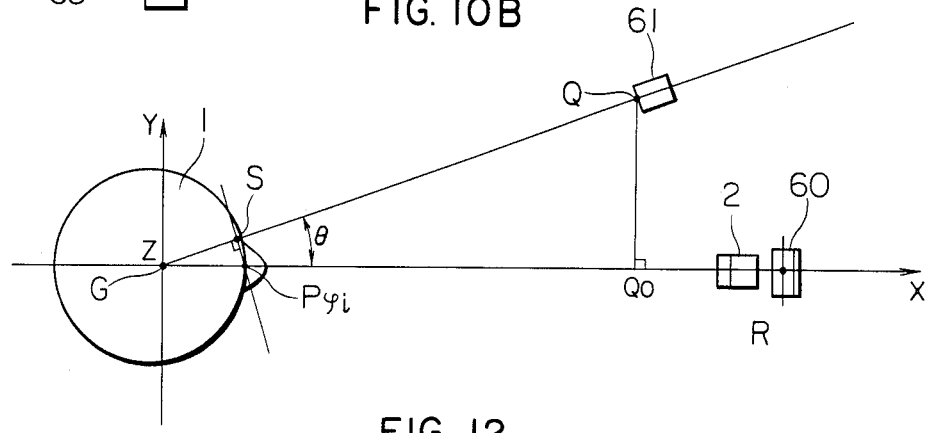

A third embodiment of this invention will be explained referring to FIGS. 10A and 10B which show a portion of the arrangement of the embodiment.

Figure 11:
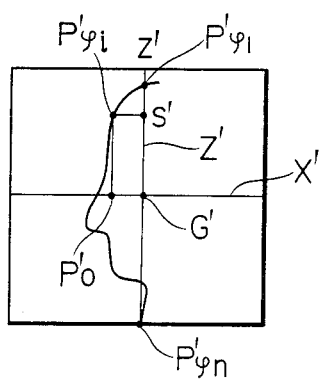
FIG. 11 shows an optical locus picked up by a PSD camera in the third embodiment of this invention.

In the figures, numeral 2 designates a laser beam generator for generating laser beam light 60 is a revolving mirror for scanning the X-Y axis plane of the model 1 by the generated laser beam light about a point R of the X-axis. The laser beam light is scanned through angle of $\Psi$ of the range ($P\Psi_1$-$P\Psi_n$) including the entire portion of the object model 1 in its vertical direction (Z-axis). 61 is a position detector camera which is, for example, an image pick-up device using a two-dimensional light spot detector (PSD), and which has a principal point of its lens at a point Q of the segment, on an X-Y axis plane, passing the origin G and making an angle of $\theta$ with the X-axis and has an optical axis in accordance with the segment $\overline{GQ}$ extending from the origin G to the point Q. The optical image of the laser beam light irradiated to the model 1 is picked up by the PSD camera 61. When it is now assumed that, in FIGS. 10A and 10B, the light spot where the scanning angle of the laser beam light forming with the X-axis is $\Psi i$ (i=1−n) is $P\Psi i$; the foot of the perpendicular line from the light spot $P\Psi i$ to the segment $\overline{GQ}$ is S; and the foot of the perpendicular line from the principal point Q of the PSD camera 61 to the X-axis is $Q_0$; then the locus of the image $P'\Psi_1$ of the light spot $P\Psi_1$, picked up by the PSD camera 61 results as shown in FIG. 11. Namely, the locus is that of the sectional shape on the X-Z axis plane of the model 1. In FIG. 11, points S' and Po' are those resuling from the pick-up of the above points S and Po by the PSD camera, respectively and lines X', Y', and Z' correspond to the X-axis, Y-axis and Z-axis, respectively.

When calculating the X co-ordinate $X\Psi i$ and Z co-ordinate $Z\Psi i$ of the light spot $P\Psi_i$, from FIG. 11, they are obtained from the following equations since the former is equal to the segment $\overline{GP\Psi_i}$ and the latter is equal to $\overline{Po\,P\Psi_i}$:

$$X \text{ co-ordinate } X_{\psi i} = \overline{G\,P_{\psi i}} \tag{6}$$
$$= \frac{\overline{G'Po'}}{K \times \sin\theta}$$

where
K: optical magnification of the PSD camera
$\overline{G'P'o}$: distance between the point G' and the point P'o on the PSD image plane (FIG. 11).

$$Z \text{ co-ordinate } Z_{\psi i} = \overline{PoP_{\psi i}} \tag{7}$$
$$= \frac{\overline{Po'\,P'_{\psi i}}}{b} \times (\overline{GQo} - \overline{GPo})$$
$$= \frac{\overline{Po'\,P'_{\psi i}}}{b} \times \left( \overline{GQ}\cos\theta - \frac{\overline{G'\,Po'}}{K \times \sin\theta} \right)$$

where
b: distance from the principal point to the PSD image pick-up plane
$\overline{Po'P'\psi_i}$: length between the point P'o and $P'\psi_i$ on the PSD image plane (FIG. 11)

Explanation will be made on the method of calculating the position of the image $P'\psi_i$ of the light spot on the PSD image plane of the PSD cameral 61. When a light spot is incident to one point of the PSD image pick-up plane, e.g., point W, a photo-electric current is generated at the point W. This photo-electric current flows towards the electrodes $A_1$, $A_2$, $B_1$ and $B_2$ arranged at four ends of the PSD image pick-up plane, and the magnitude of the current is inversely proportional to the distance from the point W to each electrode. Assuming that, as seen from FIG. 12, the abscissa passing the center point of the image pick-up plane is an a-axis, the ordinate is a b-axis, and the current flowing into each electrode $A_1$, $A_2$, $B_1$ and $B_2$ are $IA_1$, $IA_2$, $IB_1$ and $IB_2$, the position of the point W for the a-axis and b-axis is obtained from the following equation:

Distance from the point W to the a-axis (Wa)

$$= \frac{IA_1 - IA_2}{IA_1 + IA_2} \times \frac{l_1}{2} \tag{8}$$

Figure 12:
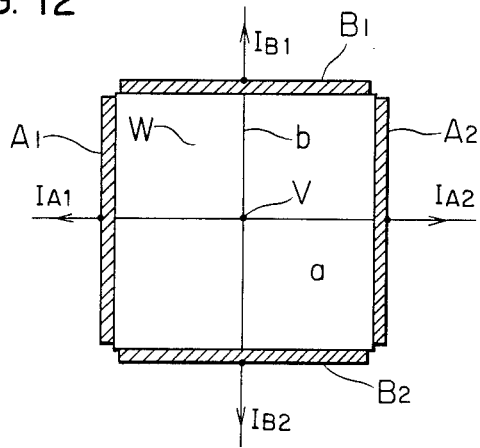
FIG. 12 shows a pick-up screen of the PSD camera employed in the third embodiment of this invention.

Distance from the point W to the b-axis (Wb)

$$Wb = \frac{IB_1 - IB_2}{IB_1 + IB_2} \times \frac{l_2}{2} \tag{9}$$

where
$l_1$: distance between the electrodes $A_1$ and $A_2$
$l_2$: distance between the electrodes $B_1$ and $B_2$ Further, the position of the point $P'\psi_i$, i.e., $\overline{G'\,Po'}$, $\overline{Po'P\psi_1}$ is calculated from the above equations in such a manner that the a-axis and b-axis are determined on the image pick-up plane of the PSD camera 61 as shown in FIG. 12 so that they correspond to the images X' and 2' of the X-axis and Z-axis, respectively.

More specifically, the model 1 is scanned from its top end $P\psi_n$ to its bottom end $P\psi_n$ with the laser beam light by means of the revolving mirror 60, the optical image of the laser beam light irradiated to each position of $P\psi_1$ to $P\psi_n$ is picked up by the PSD camera, and thereafter the operations of the above equations, (6), (7), (8) (9) are made to provide $X\psi_i$, $Z\psi_i$ of each position. Combining the respective coordinates $(X\psi_i, Z\psi_i)$ of $P\psi_1$ to $P\psi_n$ measured in order provides a two-dimensional shape corresponding to an approximately semicircular section relative to the X-Z axis plane of the object model 1. The two-dimensional shape consisting of a series of the acquired coordinates $(X\psi_1, Z\psi_i)$ of the positions $P\psi_1$ to $P\psi_n$ may be stored in a memory to be used as data for producing a three-dimensional shape which will described later.

Thus, explanation has been made on the means for acquiring the two-dimensional shape relative to the X-Z axis plane of the model 1. However, in order to produce the three-dimensional shape of the model 1, the two-dimensional shape of the entire model 1 must be acquired. To this end, the model 1 is rotated. More specifically, the position of the model 1 relative to the X-Z axis plane is shifted, as shown in FIG. 10A, by rotating a turn table 65 by a certain angle using an electric motor 62 mounted on a fixedly supporting device 64 which is attached to a fixed object such as floor. Then, the above two-dimensional acquisition by the scanning of laser beam light is carried out to provide a two-dimensional shape relative to a new semicircular section of the model 1. The two-dimensional shapes $(X\psi_i, Z\psi_i)$ relative to the respective sections are stored in the memory to acquire the two-dimensional shapes of the entire model 1 which is also stored in the memory. Then, the rotating angle of the turn table 65 is detected by a rotary encoder 63 connected with the electric motor 62, and the output of the rotary encoder is stored together with the two-dimensional shapes relative to each section of the model 1.

Figure 13:
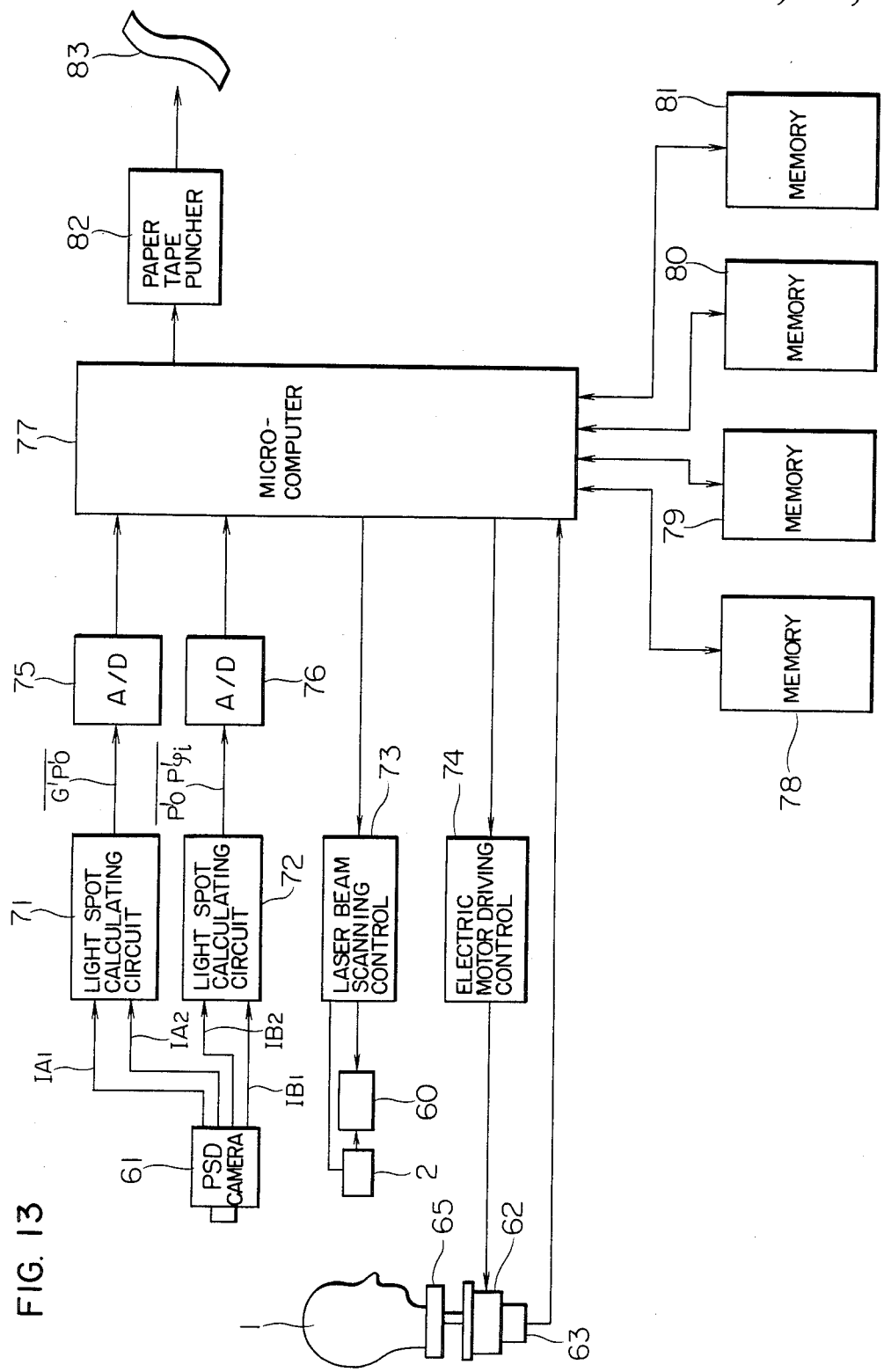
FIG. 13 is a block diagram which shows the operation and production of a three-dimensional shape in the third embodiment of this invention.

FIG. 13 shows a block diagram of an electric circuit for acquiring a three-dimensional shape on the basis of the above acquired two-dimensional shapes. Hereafter, its operation as well as its arrangement will be explained. In the figure, numeral 1 designates a model as an object, 2 designates a laser beam generator, 60 designates a rotary mirror, and 61 designates a PSD camera.

The arrangement for producing the three-dimensional shape of the model 1 comprises light spot position calculating circuits 71, 72 for detecting the position of each light spot picked up by the PSD camera 61, a laser beam light scanning control circuit 73 for controlling the rotary mirror 60 for scanning the laser beam light, an electric motor driving control circuit for controlling the electric motor 62 for rotating the model by a certain minute angle, and A/D converters 75, 76, a microcomputer 77, memories 78, 79, 80, 81, a paper tape puncher 82 which perform the processing, operation, storage, and outputting of data.

The operation of the above arrangement will be explained. For simplicity the case where the first irradiation of laser beam light is made at a rotating angle of 0° of the model 1 will be explained first. The rotary mirror 60, in response to the output of the laser beam light scanning control circuit 73, irradiates the laser beam light to the top end $P_{\psi 1}$ to the bottom end $P_{\psi n}$ of the model 1.

The light spots at $P_{\psi 1}$ to $P_{\psi n}$ are picked up by the PSD camera 61 and the photo-electric current $IA_1$, $IA_2$ and $IB_1$, $IB_2$ corresponding to the each of light spots, which are produced by the PSD camera, are input into the light spot position calculating circuits 71, 72, respectively. The light spot position calculating circuit 71 provides an analog voltage corresponding to $\overline{G'P_o'}$ on the basis of $IA_1$ and $IA_2$ while the light spot position calculating circuit 72 provides an analog voltage corresponding to $\overline{P_o'P_{\psi'}}$ on the basis of $IB_1$ and $IB_2$. These analog voltages, after converted into digital values by the A/D converters 75, 76, are input into the microcomputer 77.

The operations of the above equations (6), (7) are made using the digital values corresponding to $\overline{G'P_o'}$ and $\overline{P_o'P_{\psi'i}}$, input into the microcomputer 77, in order to acquire the X co-ordinate and Z co-ordinate of the light spot $P_{\psi i}$, i.e., $[X\Psi_i, Z\Psi_i]$. This value $[X_{\psi i}, Z_{\psi i}]$ as well as the rotating angle of the turn table (now 0°), detected by the rotary encoder 63 is stored in the memory 78. Thus, the above acquisition is repeated for each fixed time (within the time, the laser beam light is continuous) while the light spot P is shifted from the top end $P_{\psi 1}$ to the bottom end $P_{\psi n}$ of the model 1 by the scanning of the laser beam, so that stored in the memory 78 are the X co-ordinates and Z co-ordinates of the two-dimensional shape of the approximately semicircular section (observable by the PSD camera) relative to the X-Z axis plane of the model 1 when the rotating angle of the turn table 65 is 0°.

Next, the turn table 65 is rotated by a fixed angle of $\Delta\alpha = 360°/m$ (m indicates a range within which the laser beam is continuous) by means of the electric motor 62 by applying a driving signal to the electric motor driving circuit 74 from the microcomputer 77. This rotating angle $\Delta\alpha$ is input into the microcomputer 77 by means of the rotary encoder 63 connected with the electric motor 62.

After having rotated the turn table 65 and so the model 1 by an angle of $\Delta\alpha$ by the electric motor 62, the above two-dimensional acquisition is performed to obtain the X co-ordinates and Z co-ordinates of the two-dimensional shape of a new section relative to the X-Z axis plane of the model 1, and these co-ordinates are stored in the memory 78. Thereafter, this acquisition will be repeated in order after having rotated the model 1 by a fixed angle $\Delta\alpha$.

An example of the storage state of the memory 78 will be explained referring to FIG. 14. In the figure, memory addresses designate the positions of the light spots $P_{\psi 1}$ to $P_{\psi n}$ by the scanning of the laser beam, and the rotating angle from the memory encoder 63, the X co-ordinate and Z co-ordinate are stored on the corresponding memory address.

The two-dimensional shapes thus obtained by the above two-dimensional acquisitions of the model 1 are relative to the sections displaced for each fixed angle of $\Delta\alpha$ about the center of the model 1 and so the stacking of these two-dimensional shapes cannot provide the three-dimensional shape equivalent to the model 1. Therefore, the data of the X-Z co-ordinates $[X\psi_i, Z\psi_i]$ stored in the memory 78 must be converted into those of the two-dimensional shapes relative to the sections parallel to the section at a rotating angle of 0°.

The conversion of data is made with the section at a rotating angle of 0° being coincident with the X-Y plane. Then, at a rotating angle of $j\Delta\alpha$ ($j=0, 1, 2, 3, \ldots, m$) as shown in FIG. 15 the X co-ordinate $X_{\psi i}(j\Delta\alpha)$, Y co-ordinate $Y_{\psi i}(j\Delta\alpha)$, and $Z_{\psi i}(j\Delta\alpha)$ of the light spot $P_{\psi i}$ are derived from the following equations:

$$\begin{aligned} X_{\psi i}(j\Delta\alpha) &= X_{\psi i} \times \cos(j\Delta\alpha) \\ Y_{\psi i}(j\Delta\alpha) &= Y_{\psi i} \times \sin(j\Delta\alpha) \\ Z_{\psi i}(j\Delta\alpha) &= Z_{\psi i} \text{ (corresponding to} \\ & j \times \frac{360°}{m} \text{ in the memory 78)} \end{aligned} \quad (10)$$

This three-dimensional co-ordinates $(X_{\psi i}, Y_{\psi i}, Z_{\psi i})$ of the light spot $P_{\psi i}$ is stored in a memory 79. An example of the storage manner of the memory 79 is shown in FIG. 16.

All the co-ordinates of the light spots in each section, that are necessary to produce the three-dimensional shape of the model 1, have been obtained from the above operations. Next, in order to facilitate the production of the three-dimensional shape, as shown in FIG. 17, the Y-axis is divided at intervals of a fixed minute distance ($\Delta y$), and for each range of the Y co-ordinates included each interval the corresponding co-ordinate data $Y_{\psi i}(j\Delta\alpha)$ of the three-dimensional shape, stored in the memory 79 are classified by the following equation:

$$K \cdot \Delta y \leq Y_{\psi i}(j\Delta\alpha) < (K+1)\Delta y \quad (11)$$

where $K = 0$ or an integer of $\pm 1, \pm 2, \pm 3 \ldots$.

Figures 17, 18:
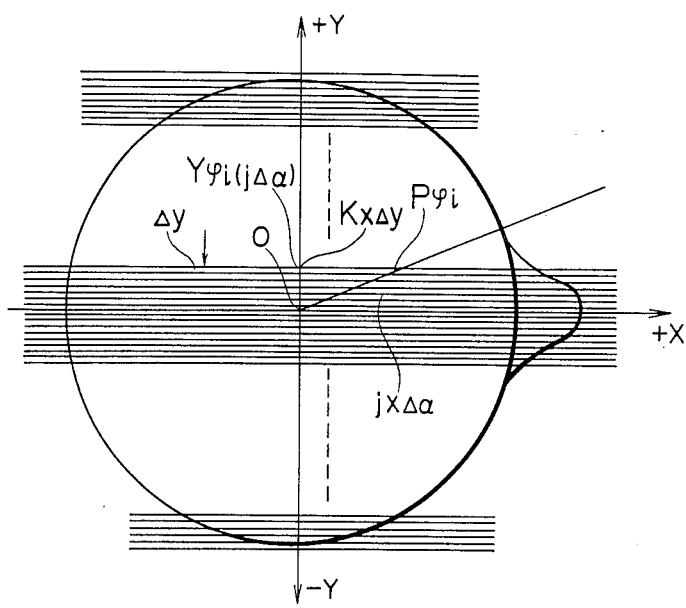
FIG. 17 shows a principle of forming a parallel section to be used in the production of the three-dimentional shape in the third embodiment.
FIG. 18 shows a memory-map employed to form the parallel section as shown in FIG. 17.

The classified result is stored in a memory 80 in such a manner as shown in FIG. 18. More specifically, all $Y_{\psi i}(j\Delta\alpha)$'s contained in a certain range of the Y co-ordinates, e.g., $K \cdot \Delta y \leq Y < (K+1)\Delta y$ are extracted from the memory 77 and sequentially stored in the memory 80 according to their classified data, together with the corresponding $X_{\psi i}(j\Delta\alpha)$ and $Z_{\psi i}(j\Delta\alpha)$. Thus, the co-ordinates $X_{\psi i}(j\Delta\alpha)$ and $Z_{\psi i}(j\Delta\alpha)$ stored in the memory 80 for each interval, $K\Delta y \leq Y < (K+1)\Delta y$ represent the shape of the section with a thickness of $\Delta y$, parallel to the X-Z axis plane of the model 1.

Incidentally, in the above classification, in the same interval of the Y co-ordinates, $K \cdot \Delta y \leq Y < (K+1)\Delta y$, there may be the same X co-ordinate $X_{\psi i}(j\Delta\alpha)$ and different Z co-ordinates $Z_{\psi i}(j\Delta\alpha)$. In this case, the average value of these $Z_{\psi i}(j\Delta\alpha)$'s may be adopted. This applies for the X co-ordinate $X_{\psi i}(j\Delta\alpha)$.

The X co-ordinates $X_{\psi i}(j\Delta\alpha)$'s classified at the intervals of the Y co-ordinate of $\Delta y$ are stored in the memory 81, with being arranged from the positive maximum value to the negative maximum value, together with $Z_{\psi i}(j\Delta\alpha)$'s. The Z co-ordinates $Z_{\psi i}(j\Delta\alpha)$'s can be also arranged in the above manner.

Thus, stored are in the memory 81 the X co-ordinates $X_{\psi i}(j\Delta\alpha)$'s and Z co-ordinates $Z_{\psi i}(j\Delta\alpha)$'s arranged from the positive maximum value to the negative maximum value. The content of the memory 81 is read out by means of the microcomputer 77 and an NC tape 83 is made using the paper tape puncher 82. The NC tape 83 is input into an NC sheet cutting device (not shown) by means of a paper tape reader (not shown). Then, the sheet with a thickness of $\Delta y$ is cut to form a template substantially equivalent to the section parallel to the X–Z axis plane of the model. When the NC sheet cutting device cuts a sheet with a thickness reduced or enlarged with the same ratio to both X co-ordinate and Z co-ordinate, the template scales down or up from the model 1 by a fixed degree.

The stacking of the templates thus obtained can provide a three-dimensional shape on a fixed reduced or enlarged scale of the model 1. In order to facilitate the stacking in the production of the three-dimensional shape, information such as plural reference holes is inputted into the NC tape to provide the respective templates with the holes. By stacking the templates so that their respective holes accord with each other and fixedly binding them, a three-dimensional shape can be easily produced.

In this embodiment, there has been explained the case where the NC sheet cutting device is used to produce the three-dimensional shape. However, the section relative to the X–Z axis plane of the model 1 can be drafted, for example, by connecting the output of the microcomputer 77 with an X–Y plotter or recorder, so that cutting the sheet according to the drafted shape also permits the three dimensional shape to be produced.

Figure 19:
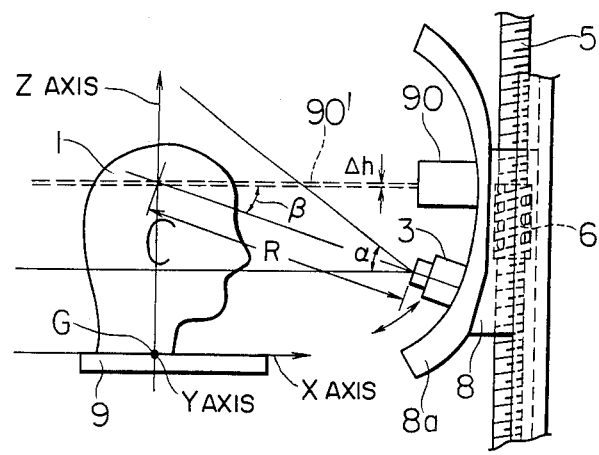
FIG. 19 is a side view of a fourth embodiment according to this invention.

Hereafter, a fourth embodiment of this invention will be explained referring to FIG. 19. As understood from the comparison between FIGS. 1A, 1B and FIG. 19, this fourth embodiment is different from the first embodiment in that in this embodiment is used a slit light irradiation device 90 for slit light 90' with a thickness of $\Delta h$, e.g., 0.5 mm instead of the beam light as laser light. The ITV camera 3 is so located that a guide device 8a, on which the ITV camera 3 is slidable with a predetermined radius R, makes it possible to change the angle of the optical axis of the ITV camera with the X–Y axis plane passing the Z-axis (Incidentally, this guide device 8a is applicable to the already described embodiments of this invention). The fourth embodiment of this invention as shown in FIG. 19 is exactly the same as the first embodiment as shown in FIGS. 1A and 1B except the above difference.

Figure 20:
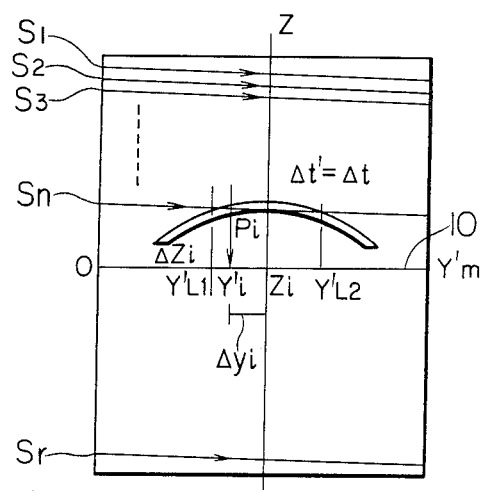
FIG. 20 shows a screen of the ITV camera (two-dimentional pick-up device) employed in the fourth embodiment.
Figure 21:
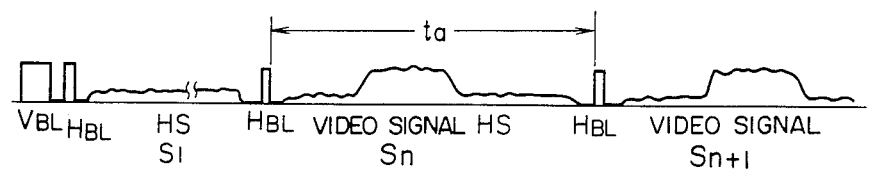
FIG. 21 shows the status of an image signal on the image plane as shown in FIG. 20.

The optical image picked up by the ITV camera 3 will be explained referring to FIG. 20. The optical image of the model 1 constitutes a sickle image because of the use of the slit light 90'. The state of the image signals in the ITV camera 3 is such as shown in FIG. 21. When the scanning line Sn intersects the sickle optical image as shown in FIG. 20, high level image signals are produced as shown in FIG. 21. The optical section of a certain section by the acquisition of the optical locus relative thereto, which is carried out through the processing of the image signals, is obtained by the data processing for the sectional shape acquisition as shown in FIG. 5 in relation to the first embodiment.

Figure 22A:
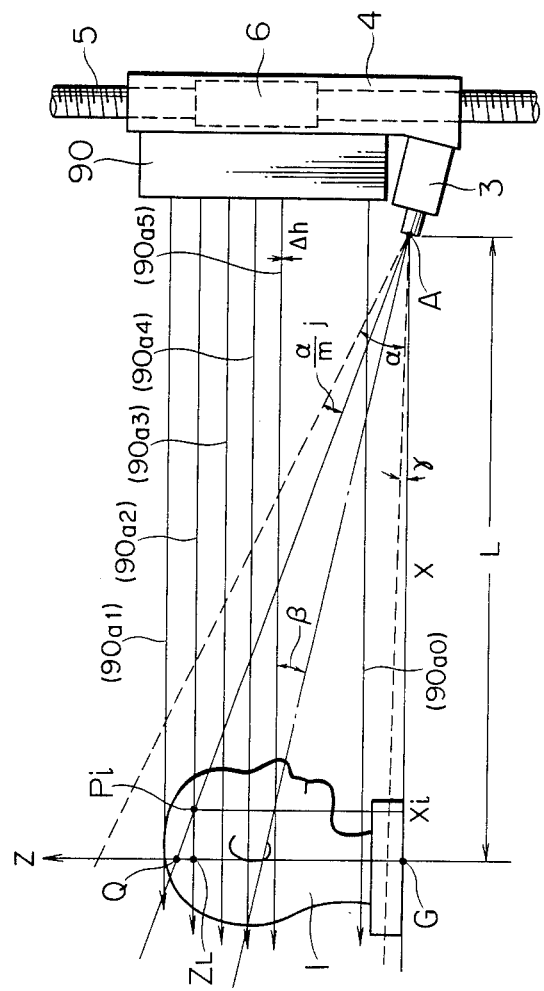
FIGS. 22A and 22B are a side view and a front view of a fifth embodiment according to this invention.
Figure 22B:
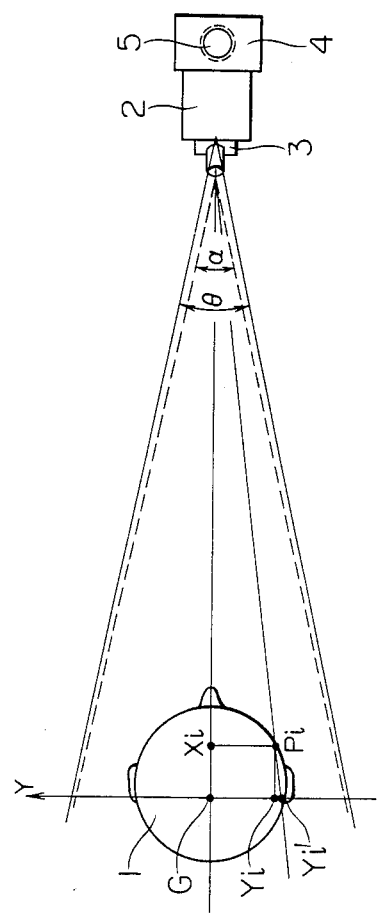

Hereafter, a fifth embodiment of this invention will be explained with reference to FIGS. 22A and 22B showing a side view and front view of the arrangement of this embodiment. The feature of this embodiment resides in that a slit light irradiation device 90 is provided for irradiating plural slit lights $90a$ in order to shorten the irradiation time of the object 1.

The slit light irradiating device 90 is constituted by plural light sources, e.g., 10 laser light generators and an optical system, e.g., cylindrical lens or concave mirror, and irradiates to the model 1 plural (e.g. 10) slit lights $90a_1$–$90a_{10}$ each with a thickness of $\Delta h$ (e.g. 0.5 mm) and a spreading angle of $\theta$. The slit lights $90a_1$–$90a_{10}$ each takes as a center line a perpendicular line drawn from the center of the corresponding light source to a center line, here the Z-axis of the model 1, and arranged so that they are irradiated in parallel to each other and at equal intervals, e.g., 30 mm.

The ITV camera 3 as a two-dimensional image pickup device is arranged at a fixed distance from the slit light irradiation device 90, and so that the optical axis of the camera is directed to the model 1 and forms a predetermined angle with the slit light $90a_1$14 $90a_{10}$ (For example, an angle of $\beta$ is formed with the slit light $90a_5$). Further, it is assumed that the effective view angle of the ITV camera 3 is $\alpha$, the point where the perpendicular line drawn from the principal point of the lens of the camera to the Z-axis intersects the Z-axis is G, the segment perpendicularly intersecting the X-axis and the Z-axis is a Y-axis, and the point G is an origin of each co-ordinate axis.

The slit light irradiation device 90 and the ITV camera 3 are fixedly mounted on the rack 4 which is slidably guided on a guide post; the rack 4 is attached on the ball nut 6 screwed with the ball screw shaft 5. The step motor (not shown) connected with the ball screw shaft 5 stepwise drives the ball nut 6 up and down by the thickness $\Delta h$ of the slit light. Thus, slit light is stepwise irradiated to the model.

In order to irradiate the entire periphery of the model 1 with the slit light $90a$ and pick up the resultant optical image, plural slit light irradiation devices 90 and ITV cameras 3 associated therewith may be arranged so as to surround the model 1.

When, in this case, the distance from each ITV camera to the Z-axis as the center line of the model 1 is equally set, and its optical magnification is also equally set, the operation for forming the NC data on the basis of the measurement result can be simplified since the optical images corresponding to the slit lights picked up by the associated ITV cameras 3 can be directly compared. However, this is not an indispensable requisite. For example, with only the shape of a certain section of the object being previously and actually measured, by comparing the thus obtained data with the data produced from the picking up of the above section by the respective ITV cameras 3, it is also possible to calibrate the measurement data of each camera.

Figure 23:
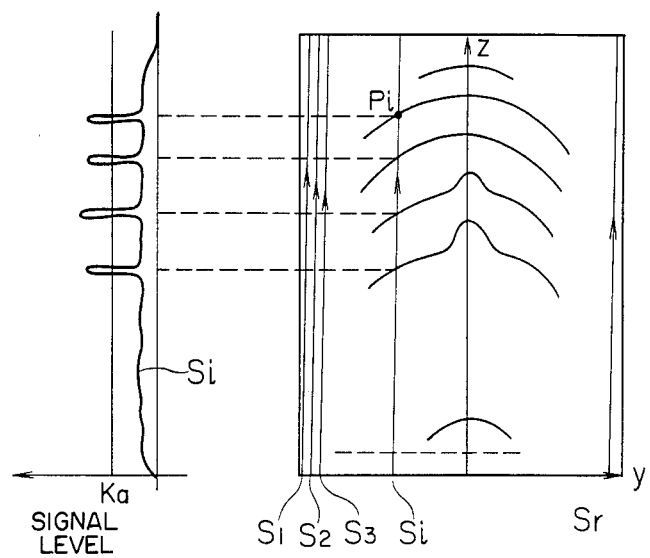
FIG. 23 shows an image of the ITV camera employed in the fifth embodiment.

FIG. 23 shows the optical image of the slit lights $90a$ irradiated to the model 1 which is picked up by the ITV camera 3. When, with the ITV camera 3 arranged so that the direction of its scanning lines is parallel to the plane formed by the X-axis and Z-axis, i.e., X–Z plane, the optical images corresponding to the slit lights $90a$ irradiated to the model 1 are picked up by the ITV camera 3, 10 arch slit images are provided as shown in FIG. 23. The point P'i included in the slit image in FIG. 23 is an image of the point Pi in FIGS. 22A and 22B, and corresponds to any one point of the slit light irradiated to the surface of the model 1. The co-ordinates y and z corresponds to the X axis and Z axis in FIGS. 22A and 22B. Incidentally, in FIG. 23, $S_1$–$S_i$–$S_r$ designate scanning lines of the ITV camera 3 and Ka is a threshold value for digitizing the picked-up signal into two values of brightness (high) and darkness (low).

In order to acquire an optical section from the image picked up by the ITV camera 3 as shown in FIG. 23, there will be explained means for the co-ordinates of the point Pi relative to the X-axis, Y-axis and Z-axis. As shown in FIG. 23, one image plane of the ITV camera 3 is formed by scanning the image signal from ITV camera 3 on r (generally, 250–500) scanning lines. These scanning lines are referred to $S_1$, $S_2$, $S_3$-$S_i$-$S_r$ from left in accordance with the scanning order of the image signal.

Figure 24:
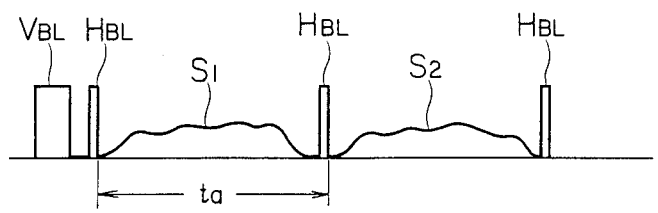
FIG. 24 shows the status of a video signal on the image plane as shown in FIG. 23.

The pick-up of the optical image of the model 1 by the ITV camera 3 provides an output signal as shown in FIG. 24. The output signal is output in such a way that, as shown in FIG. 24, first, an image plane starting signal $V_{BL}$ (hereinafter referred to as vertical synchronizing signal) is output, next a first horizontal scanning starting signal (hereinafter referred to as horizontal synchronizing signal) is output and thereafter the image signal in accordance with the brightness or darkness of the optical image is scanned on the scanning line $S_1$ within a fixed time ta. After the completion of the first scanning, a second horizontal synchronization $H_{BL}$ is output and the image signal is scanned on the scanning line $S_2$. Thereafter, the scanning of the image signal is repeated until the scanning line $S_r$ in the same manner. Thus, one image plane is accomplished.

Figure 25:
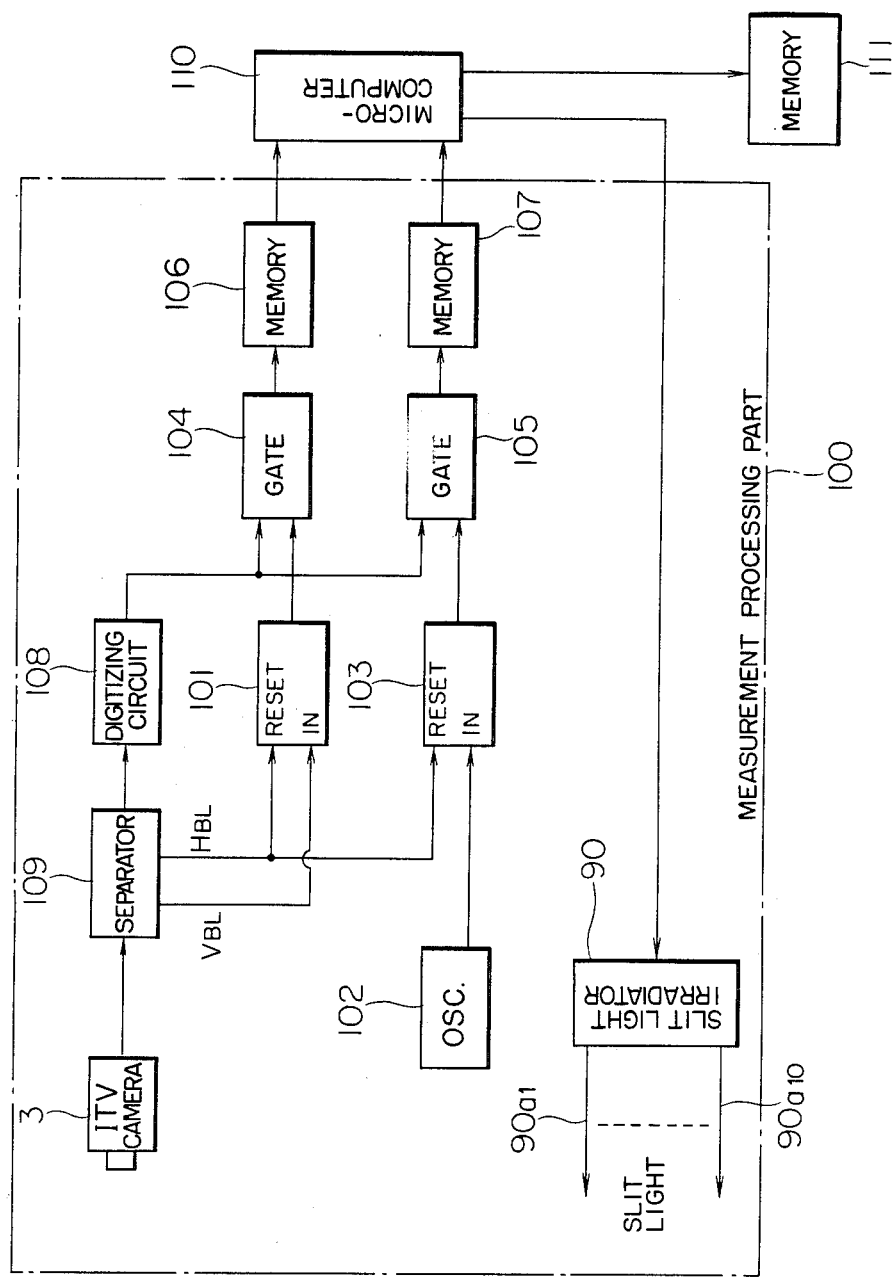
FIG. 25 is a block diagram which shows a measurement processing section for the sectional shape in the fifth embodiment.

FIG. 25 shows a block diagram of a control circuit for acquiring the co-ordinates (xi, yi, zi) of the light spot Pi of FIG. 23, relative to the X axis, Y-axis and Z-axis, using the ITV camera 3. In FIG. 25, 3 is the ITV camera, and 109 is a synchronization separating circuit in which the image signal S corresponding to the optical image of the model 1 which is obtained by the irradiation of the slit light 90a and picked up by the ITV camera and is inputted together with the horizontal synchronizing signal $H_{BL}$ and the vertical synchronizing signal $V_{BL}$ is separated from $H_{BL}$ and $V_{BL}$.

101 designates a counter having a count input terminal (IN) coupled with the horizontal synchronizing signal $H_{BL}$ from the synchronization separating circuit 109 and a reset input terminal (RESET) coupled with the vertical synchronizing signal $V_{BL}$. The counter 101 is reset to 0 by the vertical synchronizing signal $V_{BL}$ produced prior to the scanning of one image plane and counts the number of the horizontal synchronizing signals $H_{BL}$ each produced prior to the start of the scanning on each scanning line $S_1$-$S_r$. The count of the counter 101 represents the number of the scanning line on which the video signal from the ITV camera is scanned.

102 designates an oscillation circuit which continuously outputs a pulse each time interval ta/m resulting from the division of the time required to scan one scanning line into m equal parts. The pulses produced from the oscillator 102 are counted by a counter, which is reset to 0 by the horizontal synchronizing signal $H_{BL}$. These pulses are counted by the counter 103 until the horizontal synchronizing signal $H_{BL}$ for the subsequent scanning line is produced. Thus, the scanning point on the image plane of the ITV camera 3 is acquired. The number of the pulses counted by the counter 103 is stored in a memory circuit 107 through a gate circuit.

The image signal of the ITV camera 3, which has been separated from the vertical synchronizing signal $V_{BL}$ and the horizontal synchronizing signal $H_{BL}$ in the synchronizing separation circuit 109, is converted into a digital signal having two values of brightness "1" and darkness "0" (hereinafter referred to as digitized signal) in a digitizing circuit 108 using a predetermined signal level Ka (FIG. 23) as a reference level. Thus, the bright slit optical image portions of the outer periphery of the model 1 is represented by "1" and the other portions thereof is represented by "0". This digitized signal is applied to the respective gate switching control terminals N of gate circuits 104, 105, and the gate circuits 104, 105 are closed only when the digitized signal is "1", thereby storing the contents of the counters 101, 103 into memory circuits 106, 107, respectively. Thus, there can be stored the scanning line number (content of the counter 101) and the position of a certain scanning line (content of the counter 103) when having picked up the optical image of the model 1. It is now assumed that the content of the memory circuit 106 is $\Delta Yi$ and the content of the memory circuit 107 is $\Delta Zi$.

Further, as the case may be, plural $\Delta Yi$'s and $\Delta Zi$'s are provided for one scanning line; all of these $\Delta Yi$-$\Delta Yip$ and $\Delta Zi$-$\Delta Zip$ are stored in the memory circuits 106, 107. There may be the light spots of the plural slit optical images on one scanning line. Therefore, the identification of $\Delta Yi$'s and $\Delta Zi$'s is made in synchronism with the lighting commands of the slit lights $90a_1$-$90a_{10}$, which are sequentially applied to the slit light irradiation device 90 from a microcomputer 110.

The acquisition of $\Delta Yi$ and $\Delta Zi$ allows the X and Y co-ordinates (Xi, Yi) of the point Pi of the model 1 to be acquired in the following manner, referring to FIG. 22A.

The point Pi as shown in FIGS. 22A and 22B is an intersection of a segment $\overline{AQ}$ and a segment $Z=ZL$, and Xi is provided by the following equations:

$$\begin{cases} Zi = ZL \\ Zi = -\frac{\overline{GQ}}{L} Xi + \overline{GQ} \end{cases} \quad (13)$$

$$\therefore Xi = \frac{L}{\overline{GQ}} (GQ - ZL) \quad (14)$$

where
$\overline{GQ}$ distance between points G and Q,
L: distance between the Z-axis and the center of the ITV camera lens
ZL: distance between the slit light $90a_2$ and the X-axis
$\overline{GQ}$ in equation (14) is provided by $$\overline{GQ} = L\tan\left(\alpha + \gamma - \frac{\alpha}{m} \cdot \Delta Zi\right) \quad (15)$$

where
$\alpha$: view angle of the ITV camera
$\gamma$: angle formed by the view of the bottom end of the ITV camera with the X-axis
m: sampling time
Yi is provided by $$Yi = (L - Xi)\tan\left(\frac{\alpha}{2} - \frac{\alpha}{r} \cdot \Delta yi\right) \quad (16)$$

where
r: total number of scanning lines on one image plane
Xi: value provided by equations (14) and (15)
The operations of equations (14), (15), (16) are carried out by the microcomputer 110 and the result thereof is stored in a memory 111.

After all of the X and Y co-ordinates (Xi, Yi) relative to one image plane of the ITV camera 3 have been calculated and the result thereof has been stored, the rack 4 as shown in FIG. 22A is driven by the step motor (not shown) by a thickness $\Delta h$ of the slit light in order to perform the same processing as mentioned above.

The rack 4 is moved by the interval $\Delta h$ of the adjoining slit lights.

The above explanation has been made for one measurement device including the ITV camera. When the three-dimensional measurement of the entire periphery of the model 1 is intended, a plurality of the ITV cameras 3 are arranged at an even distance from the Z-axis of the model 1 together with measurement processing parts associated therewith to acquire the corresponding $\Delta Y_i$'s and $\Delta Z_i$'s. The data of $\Delta Y_i$'s and $\Delta Z_i$'s relative to each camera are inputted into the microcomputer 110 to calculate the corresponding co-ordinates $(X_i, Y_i)$, and the result of the calculation is stored in the memory 111. Thus, the three-dimensional measurement of the entire periphery of the model 1 is performed. Then, the plurality of ITV cameras provide plural image planes, which give rise to some overlapping between the image planes adjacent to each other. However, this overlapping can be obviated by previously setting the range of image pick-up of each ITV camera. For example, where n ITV cameras are arranged around the model 1 at regular intervals, the image pick-up range can be set about the optical axis of each ITV camera 3 in a range of $\pm 360/2n$ relative to the Z-axis. Further, in this embodiment, in order to simplify the operation processing, all of the ITV cameras are shifted to be situated at the same level of the Z-axis.

Figure 26:
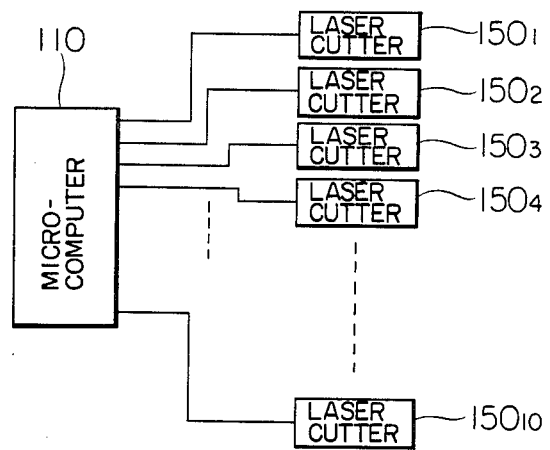
FIG. 26 is a schematic diagram of a working system for slice cutting in the fifth embodiment.

Next, explanation will be made on the manner of producing or copying the three-dimensional shape of the model 1 on the basis of the thus obtained optical spots $(X_i, Y_i)$ thereof. It is now assumed that the scanning lines of the plurality of ITV cameras $3_1$-$3_n$ are $1S_i$-$nS_i$, respectively, and the co-ordinates of the slit lights $90a_1$-$90a_{10}$ relative to the scanning line $1S_i$, stored in the memory 111 are $(X_i 90a_1, Y_i 90a_1)1S_i$—$(X_i 90a_{10}, Y_i 90a_{10}) 1S_i$. In this embodiment, as shown in FIG. 26, ten NC laser cutting machines $150_1$-$150_{10}$ for sheet cutting constitutes a working system which is controlled by the NC commands from the microcomputer 110 connected with these cutting machines. After a sheet with a thickness of $\Delta h$ is set, in each laser cutting machine $150_1$-$150_{10}$ the above co-ordinate commands $(X_i 90a_1, Y_i 90a_1)1S_1$—$(X_i 90a_{10}, Y_i 90a_{10})1S_1$ are applied to the cutting machines, respectively to start the cutting of the sheets. Next, the co-ordinate commands $(X_i 90a_1, Y_i 90a_1)1S_2$—$(X_i 90a_{10}, Y_i 90a_{10})1S_2$ are applied to the laser cutting machines $150_1$-$150_{10}$, respectively, to perform the respective cuttings. Such an operation is repeated until the execution of the co-ordinate commands $(X_i 90a_{10}, Y_i 90a_{10}) 1S_r$. After the completion of the NC cutting relating to the ITV camera $3_1$, the NC cutting based on the co-ordinate commands $(X_i 90a_1, Y_i 90a_1)2S_1$—$(X_i 90a_{10}, Y_i 90a_{10})2S_r$ is performed for the ITV camera $3_2$. The similar cutting is repeated until the ITV camera $3_n$. Thus, there are provided at a first measurement point templates each with a thickness $\Delta h$ having the same shape as the sectional shape of the model relative to each of the slit light planes $90a_1$-$90a_{10}$. Subsequently, the processing is made at a second measurement position. The repetition of such a processing by the predetermined times of measurement provides the templates corresponding to all of the sectional shapes relative to the model.

The stacking of the thus formed templates in the measurement order, e.g. the fixing using adhesive allows the model to be easily copied.

In accordance with this embodiment, a high speed operation processing can be realized since a plurality of slit lights are arranged so as to be irradiated to the Z-axis of the model so that the slit light sources are shifted by a short distance and the irradiation time of the slit light is reduced. Moreover, the scanning lines of the ITV cameras are arranged in a direction perpendicular to the plane of irradiation of the slit light so that twice or more resolution in that direction can be provided as compared with that in the X, Y directions thereby improving the measurement accuracy for the model in the Z direction.

Incidentally, although in this embodiment, in order to simplify the operation processing, all of the ITV cameras are shifted to be situated at the same level with respect to the Z-axis, this is not an indispensable requisite. For example, by applying the measurement result of the height of each ITV camera through an encoder, for example, to a microcomputer, the data $(X_i, Y_i)$ provided by each ITV camera are matched to the same height. Enlarging or reducing the thickness of the sheet to be cut by the NC cutting machine to $N\Delta h$ or $\Delta n/N$ and multiplying the data $(X_i, Y_i)$ N times or $1/N$ times permits the shape of the model to be enlarged or reduced in any size.

Figure 27:
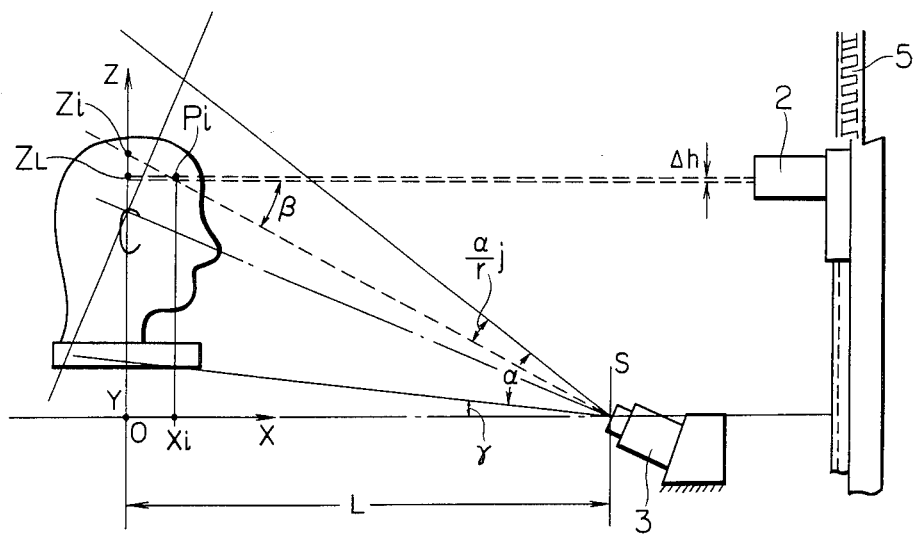
FIG. 27 is a side view showing a sixth embodiment of this invention.

FIG. 27 shows a side view of a sixth embodiment of this invention, in which the ITV camera 3 is fixed and only the laser light irradiation device 2 is movable. When the laser light irradiation device 2 is moved, the angle $\beta$ formed by the optical axis of the ITV camera 3 and the X-Y axis system plane is also changed. Therefore, when forming an optical section, the change of $\beta$ due to the shift of the laser light irradiation device must be corrected.

Figure 28A:
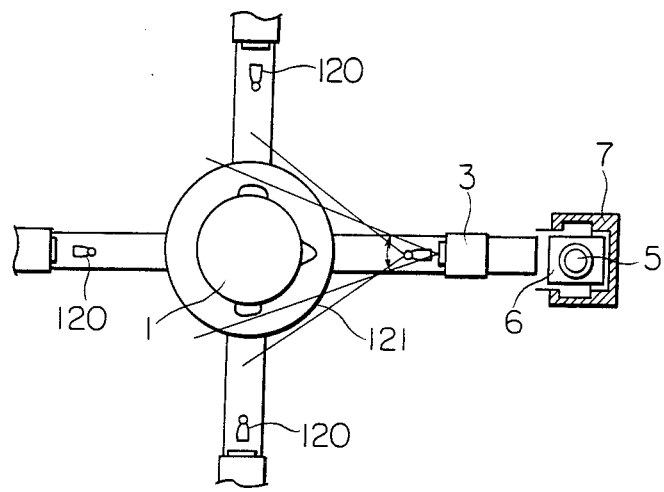
FIGS. 28A and 28B are a front view and side view of a seventh embodiment according to this invention.
Figure 28B:
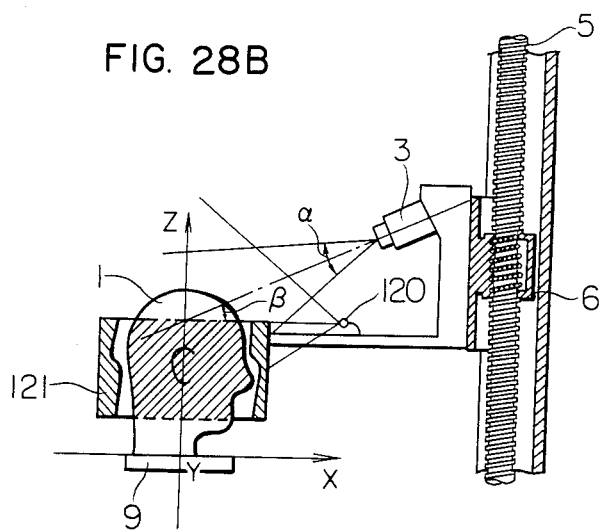
Figure 29:
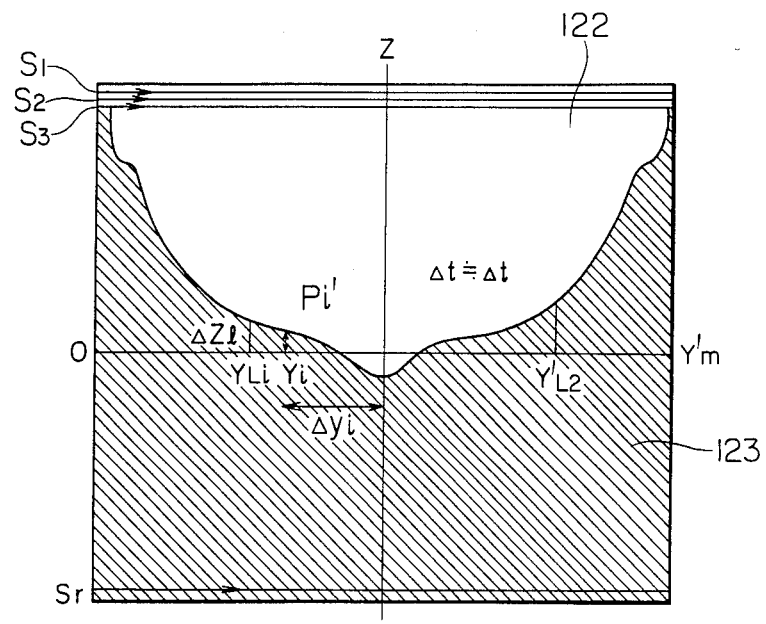
FIG. 29 shows an image of the ITV camera used in the seventh embodiment.
Figure 30:
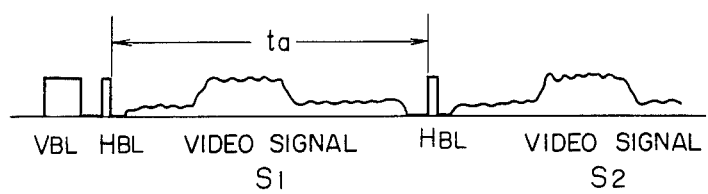
FIG. 30 shows the status of a video signal on the image plane as shown in FIG. 29.

FIGS. 28A and 28B show a front view and side view of a seventh embodiment of this invention, in which an incandescent lamp 120 is used instead of the laser light irradiation device. In this embodiment, with a cover 121 surrounding the model 1 being provided, the bright and dark portions 122 and 123 of the model 1 are picked up by the ITV camera 3 to provide image signals as shown in FIG. 4. The processing of the video signals is performed in the same manner as in the first embodiment of this invention to acquire an optical section.

Figure 31A:
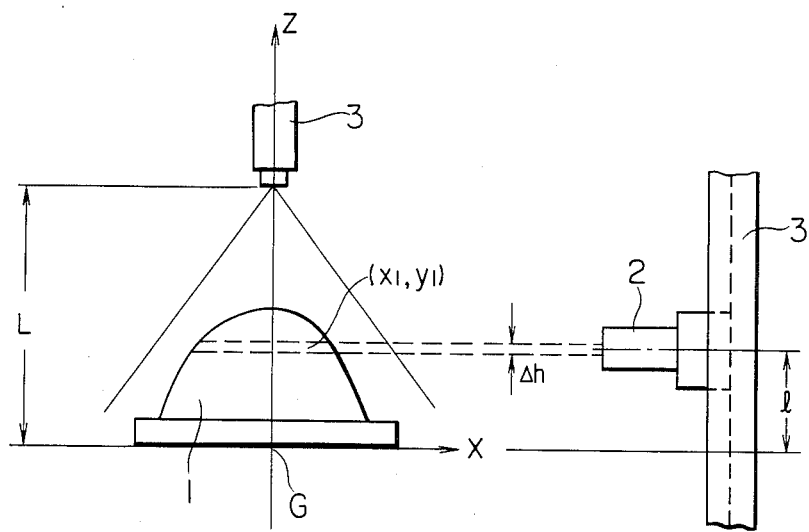
FIGS. 31A and 31B are a front view and side view of an eighth embodiment according to this invention.
Figure 31B:
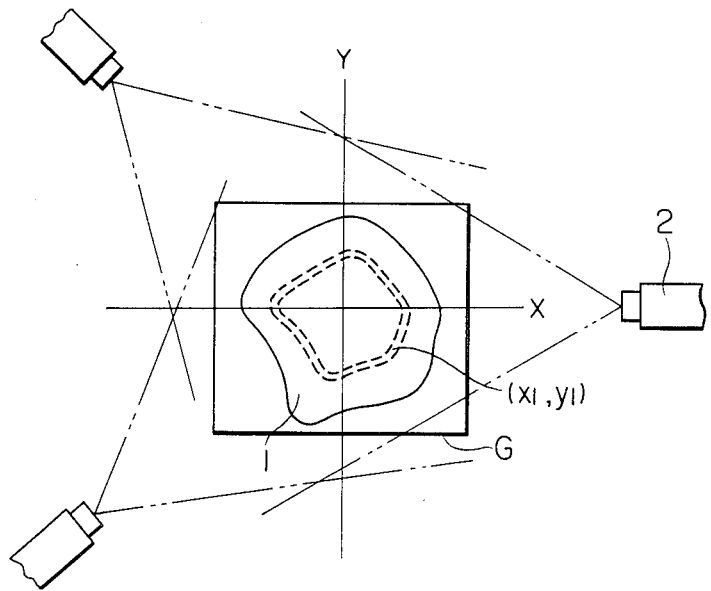
Figure 32:
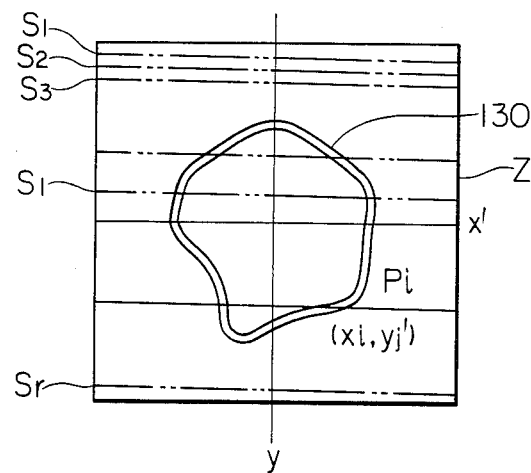
FIG. 32 shows an image of the ITV camera used in the eighth embodiment.
Figure 33:
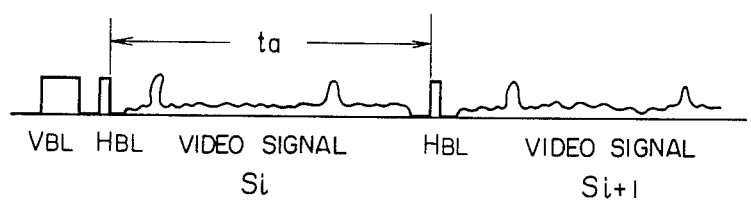
FIG. 33 shows the status of a video signal on the image plane as shown in FIG. 29.

Finally, FIGS. 31A and 31B show a side view and front view of an eighth embodiment of this invention, in which the ITV camera 3 is arranged immediately above the model 1, i.e. on the Z-axis. In this embodiment, the model 1 irradiated by the slit light irradiation device is image picked-up by the ITV camera 3 to provide an optical image 130 as shown in FIG. 32. The image signals corresponding to this optical image 130 are such as shown in FIG. 33, which are subjected to the same data processing as in the first embodiment to provide an optical section.

We claim:

1. A method of producing a three-dimensional shape from an object having a three-dimensional shape, comprising the steps of:
   irradiating parallel light having a predetermined width to the outer periphery of said object;
   picking up a reflected optical image of the irradiated object by a two-dimensional image pick-up device with its optical axis intersecting an optical plane formed by said parallel light at a predetermined angle;
   measuring a sectional shape of said object relative to said optical image on the basis of the shape of the picked-up optical image;

shifting the parallel light and the two-dimensional image pick-up device by the width of the parallel light, in a direction perpendicular to the optical plane to sequentially measure adjacent sectional shapes of the object;

after measuring the sectional shapes of the entire object, forming templates corresponding to the respective measured sectional shapes from sheets; and stacking said templates to produce a three-dimensional shape analoguous to said object.

2. A method of producing a three-dimensional shape according to claim wherein said parallel light is laser slit light.

3. A method of producing a three-dimensional shape according to claim 1 wherein said parallel light is laser beam light.

4. An apparatus for producing a three-dimensional shape from an object having a three-dimensional shape, comprising:

means for irradiating parallel light to said object in a fixed plane;

optical image pick-up means for picking up the reflected light of the light irradiated to said object;

means for measuring a sectional shape from the optical image picked up by the image pick-up means;

means for forming from a sheet a template in such a way that said sectional shape corresponds to a thickness of the sheet, on the basis of said sectional shape; and means for shifting said light irradiation means and said image pick-up device in a vertical direction perpendicular to the plane; whereby, by forming templates relative to the entire object, a three-dimensional shape equivalent or analogous to the object is produced.

5. An apparatus for producing a three-dimensional shape according to claim 4 wherein said light irradiation means is means for irradiating laser slit light.

6. An apparatus for producing a three-dimensional shape according to claim 4 wherein said light irradiation means is means for irradiating laser beam light.

7. An apparatus for producing a three-dimensional shape according to claim 4 wherein said image pick-up means is an ITV camera which is a two-dimensional image pick-up device, and said means for measuring the sectional shape measures it on the basis of the line number of the scanning lines on the ITV camera and time during a certain scanning.

8. An apparatus for producing a three-dimensional shape according to claim 7 wherein the line number of said scanning lines and the time during a certain scanning line are calculated from a horizontal scanning signal and starting signal.

9. An apparatus for producing a three-dimensional shape according to claim 4 wherein said image pick-up means is a one-dimensional line sensor camera which is a one-dimensional image pick-up device, and said means for measuring the sectional shape is means for detecting output elements of the one-dimensional line sensor camera.

10. An apparatus for producing a three-dimensional shape according to claim 4 wherein said image pick-up means is a light spot detector (PSD) sensor which is a two-dimensional image pick-up device, and said means for measuring the sectional shape is means for detecting charge amount of the PSD sensor.

11. An apparatus for producing a three-dimensional shape according to claim 4 wherein a plurality of said light irradiation means are provided which irradiate a plurality of lights to the object.

12. An apparatus for producing a three-dimensional shape according to claim 4 wherein said image pick-up means is capable of changing an image pick-up position for said object.

13. An apparatus for producing a three-dimensional shape according to claim 4 wherein said image pick-up means is fixed.

14. An apparatus for producing a three-dimensional shape according to claim 4 wherein said light irradiation means is an incandescent lamp.

15. An apparatus for producing a three-dimensional shape according to claim 4 wherein said image pick-up means is located immediately above said object, and in the direction perpendicular to that of light irradiation by said light irradiation means.

16. An apparatus for producing a three-dimensional shape from an object having a three-dimensional shape, comprising:

means for rotating said object by a minute angle;

a beam light irradiation device capable of scanning laser beam light on said object to form a beam light plane;

a two-dimensional image pick-up device fixed at a predetermined distance from and at a predetermined angle with said beam light irradiation device, and for picking up reflected light spots of the laser beam irradiated to the object;

means for calculating the positions of the light spots picking up the pick-up device for each minute angle of the object and calculating sectional shapes of the object, parallel to said beam light plane;

means for forming templates each with a predetermined scale for each of said sectional shapes from sheets of a certain thickness, on the basis of said sectional shapes; and means for stacking the templates to produce a three-dimensional shape with a predetermined scale for said object.

17. An apparatus for producing a three-dimensional shape from an object having a three-dimensional shape according to claim 16 wherein said rotating means is provided with a rotary encoder for detecting a rotating angle.

* * * * *